US006493804B1

(12) United States Patent
Soltis et al.

(10) Patent No.: US 6,493,804 B1
(45) Date of Patent: Dec. 10, 2002

(54) GLOBAL FILE SYSTEM AND DATA STORAGE DEVICE LOCKS

(75) Inventors: Steven R. Soltis, Rochester; Matthew T. O'Keefe, Plymouth; Thomas M. Ruwart, Fridley; Gerald A. Houlder, Bloomington; James A. Coomes, White Bear Lake; Michael H. Miller, Eden Prairie; Edward A. Soltis, Elk River; Raymond W. Gilson, St. Paul; Kenneth W. Preslan, Minneapolis, all of MN (US)

(73) Assignees: Regents of the University of Minnesota, Minneapolis, MN (US); Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/164,957

(22) Filed: Oct. 1, 1998

Related U.S. Application Data

(60) Provisional application No. 60/061,028, filed on Oct. 1, 1997.

(51) Int. Cl.[7] ............................................... G06F 12/00
(52) U.S. Cl. ........................... 711/152; 711/153; 707/9; 707/10
(58) Field of Search ...................... 707/9, 10; 710/200; 711/152, 163; 713/200

(56) References Cited

U.S. PATENT DOCUMENTS

| | | | |
|---|---|---|---|
| 4,733,352 A | | 3/1988 | Nakamura et al. |
| 4,984,153 A | | 1/1991 | Kregness et al. |
| 5,280,612 A | * | 1/1994 | Lorie et al. ................ 395/600 |
| 5,423,044 A | | 6/1995 | Sutton et al. |
| 5,493,724 A | | 2/1996 | Cohn et al. |
| 5,550,976 A | * | 8/1996 | Henderson et al. .... 395/200.06 |
| 5,574,903 A | * | 11/1996 | Szymanski et al. ......... 395/601 |
| 5,717,917 A | * | 2/1998 | Munakata .................... 395/608 |
| 5,740,424 A | * | 4/1998 | Wataya et al. .............. 395/610 |
| 5,887,194 A | * | 3/1999 | Carson et al. .............. 395/856 |
| 5,933,824 A | * | 8/1999 | DeKoning et al. ............. 707/8 |
| 5,948,062 A | * | 9/1999 | Tzelnic et al. .............. 709/219 |

OTHER PUBLICATIONS

*Digital Technical Journal*, VAXcluster Systems, Special Issue—No. 5, (1987).

(List continued on next page.)

*Primary Examiner*—Matthew Kim
*Assistant Examiner*—Christian P. Chace
(74) *Attorney, Agent, or Firm*—Schwegman, Lundberg, Woessner & Kluth, P.A.

(57) ABSTRACT

A system includes shared Small Computer System Interface (SCSI) storage devices for processing clients coupled by a fiber channel interface. The storage devices include storage blocks, and locks controlling their use by clients. Clients issue actions to the storage devices for performing operations on the locks. A client may exclude other clients from using storage blocks using a state element to acquire the lock for shared or exclusive use. If the client modified the data, a version counter in the lock is updated when the lock is released. If an activity bit is set, the version counter is updated upon both reading and writing. Other clients can forcibly release a lock owned by a failed client by monitoring its version counter. Expiration timers associated with the locks allow acquired locks to be released by timing out. A serverless global file system (GFS) manages use of the shared storage resources, and allows remapping of the locks to the storage blocks, for example, based on activity of the locks.

34 Claims, 11 Drawing Sheets

| | | CLIENT | 105A | | LOCK[ID] | 715 | | CLIENT | 105B | |
|---|---|---|---|---|---|---|---|---|---|---|
| | ACTION | RETURN. STATE | RETURN. VERSION | CONSISTENT? | LOCK[ID]. STATE 805 | LOCK[ID]. VERSION 805 | ACTION | RETURN. STATE | RETURN. VERSION | CONSISTENT? |
| 1000 | | U | X | | U | 0 | | U | X | |
| 1001 | LOCK SHARED | S | 0 | NO | S | 0 | | U | X | |
| 1002 | NO MODIFY | S | 0 | | S | 0 | | U | X | |
| 1003 | UNLOCK | U | 0 | | U | 0 | | U | X | |
| 1004 | | U | 0 | | S | 0 | LOCK SHARED | S | 0 | NO |
| 1005 | | U | 0 | | S | 0 | NO MODIFY | S | 0 | |
| 1006 | | U | 0 | | U | 0 | UNLOCK | U | 0 | |
| 1007 | | U | 0 | | E | 0 | LOCK EXCLUSIVE | E | 0 | YES |
| 1008 | | U | 0 | | E | 0 | MODIFY | E | 0 | |
| 1009 | | U | 0 | | U | 1 | UNLOCK INCREMENT | U | 1 | |
| 1010 | LOCK SHARED | S | 1 | NO | S | 1 | | U | 1 | |
| 1011 | MODIFY | S | 1 | | S | 1 | | U | 1 | |
| 1012 | UNLOCK INCREMENT | U | 2 | | U | 2 | | U | 1 | |
| 1013 | | U | 2 | | S | 2 | LOCK SHARED | S | 2 | NO |
| 1014 | | U | 2 | | S | 2 | NO MODIFY | S | 2 | |
| 1015 | | U | 2 | | U | 2 | UNLOCK | U | 2 | |
| 1016 | LOCK EXCLUSIVE | E | 2 | YES | E | 2 | | U | 2 | |
| 1017 | NO MODIFY | E | 2 | | E | 2 | | U | 2 | |
| 1018 | UNLOCK | U | 2 | | U | 2 | | U | 2 | |

OTHER PUBLICATIONS

"Serial Storage Architecture—SCSI-2 Protocol (SSA-S2P)", *American National Standard*, ANSI X3.294-1996, 1-46, (1996).

Devarakonda, M., et al., "Evaluation of design alternatives for a cluster file system.", 1995 *USENIX Technical Conference*, 35-46, (1995).

Kroneneberg, et al., "VAXclusters: A closely-coupled distributed system", *ACM Transactions on Computer Systems*, 4(2), 130-146, (1986).

Lamport, "Time, clocks, and the ordering of events in a distributed system", *Communications of the ACM*, 21(7), 558-565, (1978).

Matthews, K.C., "Implementing a Shared File System on a HIPPI Disk Array", *Fourteenth IEEE Symposium on Mass Storage Systems*, 77-88, (1995).

Singhal, et al., "Chapter 3: Process Deadlocks", *In: Operating Systems*, McGraw-Hill, Inc, 46-67, (1994).

Soltis, S., "The Design and Implementation of a Distributed File System Based on Shared Network Storage", *Ph.D. Thesis, UMI Disseratation Services*, 1-111, (1997).

Soltis, S., et al., "Global File System (GFS)", *Presentation at RABcon*, Redwood City, CA, Included are the slides used in the presentation and distributed in the proceedings. 1-22, (1996).

Soltis, S., et al., "The Global File System (GFS)", *Fifth NASA Goddard Conference on Mass Storage Systems and Technologies*, College Park, Maryland, 319-342, (1996).

Tanenbaum, "Chapter 2: Processes", in *Operating Systems: Design and Implementation*, Prentice-Hall, 45-109, (1987).

\* cited by examiner

FIG. 8A

| LOCK[ID] | LOCK[ID].ACTIVITY | LOCK[ID].STATE | LOCK[ID].VERSION |
|---|---|---|---|
| LOCK[1] | LOCK[1].ACTIVITY 800 | LOCK[1].STATE 805 | LOCK[1].VERSION 715 |
| LOCK[2] | LOCK[2].ACTIVITY 800 | LOCK[2].STATE 805 | LOCK[2].VERSION 715 |
| ... | ... | ... | ... |
| LOCK[i] | (ACTIVITY ELEMENT) LOCK[i].ACTIVITY 800 | (STATE ELEMENT) LOCK[i].STATE 805 | (VERSION COUNTER) LOCK[i].VERSION 715 |
| ... | ... | ... | ... |
| LOCK[N] | LOCK[N].ACTIVITY 800 | LOCK[N].STATE 805 | LOCK[N].VERSION 715 |
| ... | ... | ... | ... |
| LOCK[N+M] | LOCK[N+M].ACTIVITY 800 | LOCK[N+M].STATE 805 | LOCK[N+M].VERSION 715 |

| LOCK[ID] | LOCK[ID].ACTIVITY | LOCK[ID].STATE | LOCK[ID].VERSION | LOCK[ID].LIST | | LOCK[ID].EXPIRED |
|---|---|---|---|---|---|---|
| 715~<br>LOCK[1] | LOCK[1].ACTIVITY<br>800 | LOCK[1].STATE<br>805 | LOCK[1].VERSION<br>810 | (LIST)<br>815 | (TIMER)<br>820 | (TIMER STATUS)<br>825 |
| 715~<br>LOCK[2] | LOCK[2].ACTIVITY<br>800 | LOCK[2].STATE<br>805 | LOCK[2].VERSION<br>810 | (LIST)<br>815 | (TIMER)<br>820 | (TIMER STATUS)<br>825 |
| ... | ... | ... | ... | ... | ... | ... |
| 715~<br>LOCK[i] | (ACTIVITY ELEMENT)<br>LOCK[i].ACTIVITY<br>800 | (STATE ELEMENT)<br>LOCK[i].STATE<br>805 | (VERSION COUNTER)<br>LOCK[i].VERSION<br>810 | (LIST)<br>815 | (TIMER)<br>820 | (TIMER STATUS)<br>825 |
| ... | ... | ... | ... | ... | ... | ... |
| 715~<br>LOCK[N] | LOCK[N].ACTIVITY<br>800 | LOCK[N].STATE<br>805 | LOCK[N].VERSION<br>810 | (LIST)<br>815 | (TIMER)<br>820 | (TIMER STATUS)<br>825 |
| ... | ... | ... | ... | ... | ... | ... |
| 715~<br>LOCK[N+M] | LOCK[N+M].ACTIVITY<br>800 | LOCK[N+M].STATE<br>805 | LOCK[N+M].VERSION<br>810 | (LIST)<br>815 | (TIMER)<br>820 | (TIMER STATUS)<br>825 |

FIG. 8B

| | CLIENT 105A | | | LOCK[ID] 715 | | | CLIENT 105B | | |
|---|---|---|---|---|---|---|---|---|---|---|
| | ACTION | RETURN. STATE | RETURN. VERSION | CONSISTENT ? | LOCK[ID]. STATE 805 | LOCK[ID]. VERSION 805 | ACTION | RETURN. STATE | RETURN. VERSION | CONSISTENT ? |
| 900 | | 0 | X | | 0 | 0 | | 0 | X | |
| 901 | LOCK | 1 | 0 | NO | 1 | 0 | | 0 | X | |
| 902 | NO MODIFY | 1 | 0 | | 1 | 0 | | 0 | X | |
| 903 | UNLOCK | 0 | 0 | | 0 | 0 | | 0 | X | |
| 904 | | 0 | 0 | | 1 | 0 | LOCK | 1 | 0 | NO |
| 905 | | 0 | 0 | | 1 | 0 | NO MODIFY | 1 | 0 | |
| 906 | | 0 | 0 | | 0 | 0 | UNLOCK | 0 | 0 | |
| 907 | | 0 | 0 | | 1 | 0 | LOCK | 1 | 0 | YES |
| 908 | | 0 | 0 | | 1 | 1 | MODIFY | 1 | 1 | |
| 909 | | 0 | 0 | | 1 | 1 | UNLOCK INCREMENT | 0 | 1 | |
| 910 | LOCK | 1 | 1 | NO | 1 | 2 | | 0 | 1 | |
| 911 | MODIFY | 1 | 1 | | 1 | 2 | | 0 | 1 | |
| 912 | UNLOCK INCREMENT | 0 | 2 | | 0 | 2 | | 0 | 1 | |
| 913 | | 0 | 2 | | 1 | 2 | LOCK | 1 | 2 | NO |
| 914 | | 0 | 2 | | 1 | 2 | NO MODIFY | 1 | 2 | |
| 915 | | 0 | 2 | | 0 | 2 | UNLOCK | 0 | 2 | |
| 916 | LOCK | 1 | 2 | YES | 1 | 2 | | 0 | 2 | |
| 917 | NO MODIFY | 1 | 2 | | 1 | 2 | | 0 | 2 | |
| 918 | UNLOCK | 0 | 2 | | 0 | 2 | | 0 | 2 | |

FIG. 9

| | ACTION | CLIENT 105A RETURN. STATE | RETURN. VERSION | CONSISTENT? | LOCK[ID].STATE 805 | LOCK[ID].VERSION 805 | ACTION | CLIENT 105B RETURN. STATE | RETURN. VERSION | CONSISTENT? |
|---|---|---|---|---|---|---|---|---|---|---|
| 1000 | | U | X | | U | 0 | | U | X | |
| 1001 | LOCK SHARED | S | 0 | | S | 0 | | U | X | |
| 1002 | NO MODIFY | S | 0 | | S | 0 | | U | X | |
| 1003 | UNLOCK | U | 0 | | U | 0 | | U | X | |
| 1004 | | U | 0 | | S | 0 | LOCK SHARED | S | 0 | |
| 1005 | | U | 0 | | S | 0 | NO MODIFY | S | 0 | NO |
| 1006 | | U | 0 | | U | 0 | UNLOCK | U | 0 | |
| 1007 | | U | 0 | | E | 0 | LOCK EXCLUSIVE | E | 0 | YES |
| 1008 | | U | 0 | | E | 0 | MODIFY | E | 0 | |
| 1009 | | U | 0 | | U | 1 | UNLOCK INCREMENT | U | 1 | |
| 1010 | LOCK SHARED | S | 1 | NO | S | 1 | | U | 1 | |
| 1011 | MODIFY | S | 1 | | S | 1 | | U | 1 | |
| 1012 | UNLOCK INCREMENT | U | 2 | | U | 2 | | U | 1 | |
| 1013 | | U | 2 | | S | 2 | LOCK SHARED | S | 2 | |
| 1014 | | U | 2 | | S | 2 | NO MODIFY | S | 2 | NO |
| 1015 | | U | 2 | | U | 2 | UNLOCK | U | 2 | |
| 1016 | LOCK EXCLUSIVE | E | 2 | YES | E | 2 | | U | 2 | |
| 1017 | NO MODIFY | E | 2 | | E | 2 | | U | 2 | |
| 1018 | UNLOCK | U | 2 | | U | 2 | | U | 2 | |

FIG. 10

GLOBAL FILE SYSTEM AND DATA STORAGE DEVICE LOCKS

CROSS-REFERENCE TO RELATED APPLICATIONS

This application claims the benefit of U.S. Provisional Application No. 60/061,028, filed Oct. 1, 1997.

This invention was made with government support under # N/N00019-95-1-0611 awarded by the Office of Naval Research. The government has certain rights in the invention.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD OF THE INVENTION

This invention relates generally to computer systems, and particularly, but not by way of limitation, to a global file system and data storage device locks for managing shared data storage on a networked computer system.

BACKGROUND OF THE INVENTION

Modern computer systems are often linked by a network. The network couples several computer processing clients for communication using a standard communication protocol, such as Transmission Control Protocol/Internet Protocol (TCP/IP). Data stored locally at the clients is shared with other clients by sending messages across the network. Alternatively, data is stored in data storage devices that are shared by multiple clients, rather than being stored locally by the clients. Both the shared storage device and an intermediary server are coupled to the network. The server controls client access to the shared storage device. The clients send requests for data to the server. The server accesses the shared storage device and provides the requested data to the client.

Since communication across a network is typically relatively slow, data caching is often desirable to minimize communication across the network. Rather than returning the data from the client to the shared storage device after client processing, and again retrieving the data from the shared storage device for further client processing, a duplicate copy of the data is transferred from the shared storage device to the client. The copy of the data is stored locally in a memory cache in the client, where it is accessed directly. Such direct access of cached data is much faster than retrieving the data from the shared storage device over the network.

The client may perform multiple read operations on the cached data, rather than repeatedly requesting such data be delivered over the network from the shared storage device. The client may also perform operations that alter the cached data. As a result of any such alterations, the client's cached data will be different than the original data in the shared memory device. In this case, the client must eventually write back the altered cached data to the shared storage device after it completes its processing. The altered data is transferred back over the network to the shared storage device. The obsolete original data is overwritten with the altered data.

Thus, caching requires copies of data in more than one location, such as at the shared storage device and at the client. This minimizes the time spent transferring data across the network. Caching also allows data to be prefetched from the shared storage device concurrently with other client operations. Prefetching allows the data to be already resident in the client's memory cache when needed by the client. Caching ultimately requires eventual consistency between the data in client memory cache and the shared storage device.

Sharing a storage device among several clients further complicates the task of maintaining data consistency between the client memory caches and the shared storage device. In a traditional client-server system, the task of maintaining data consistency is typically performed by a centralized server. Servers are categorized as either stateless or stateful. A stateless server maintains no information regarding a client's previous requests to access data from the shared storage device. Stateless severs rely on their clients to maintain data consistency. The clients maintain data consistency by brute force techniques, such as by using write-through caching and periodically invalidating their local memory caches. A stateful server maintains information about previous client requests to access data from the shared storage device. This state information, which is typically stored in volatile memory in the server, allows the server to call back and notify the clients that: (1) their client cached data is inconsistent with the data on the shared storage device, or (2) the client cached data must be written back to the server for updating the corresponding data residing on the shared storage device.

Using the server to maintain data consistency has several drawbacks. First, a server limits how fast data can be transferred across the network when it controls access to shared storage device. The speed at which data is obtained from the shared storage device is limited by the speed of the server. Second, a server-based architecture is susceptible to server failures. Such an architecture is not robust, because a server failure prevents all clients from accessing any of the storage devices controlled by the server. Third, maintaining a separate server for controlling access to shared storage devices adds additional complexity and expense to the system.

SUMMARY OF THE INVENTION

One aspect of the present system includes a data storage device that is accessible by first and second remote processing clients. The storage device includes at least one lock. Each lock is associated with the use of at least one storage block on the storage device by each of the first and second clients. The locks control access to the storage blocks based on control signals received from a distributed file system residing on both of the first and second clients. The clients acquire the locks for exclusive use by the acquiring client, or for shared use with other clients.

In various embodiments, the locks include: a version counter that is updated when data is written to the at least one storage block controlled by the lock, an activity element that triggers updating of the version counter for both reads and writes, an expiration timer for timing out the acquisition of the lock by the client, and a world-wide names list of clients that have acquired the lock. In various embodiments, the device locks execute actions based on control signals received from the clients. These actions are selected from the group consisting essentially of Lock, Unlock, Unlock Increment, Reset Lock, Activity On, Activity Off, Lock Shared, Lock Exclusive, Force Lock Exclusive, Touch Lock, and Report Expired actions.

Another aspect of the present system includes a method of using a system. The system has first and second processing clients, a distributed file system, a data storage device shared by the first and second clients, and a network coupled to the storage device and each of the first and second clients. The data storage device includes storage blocks and a plurality of locks. The method includes assigning a lock to at least one storage block using the file system. At least one of the storage blocks is accessed, using the first client, by acquiring the lock assigned to the at least one storage block, if the lock is available. The client acquires the lock for exclusive use by the acquiring client, or for shared use with other clients.

In various further embodiments, the method includes releasing the lock after accessing the storage block and updating a version counter associated with the lock if an activity element associated with the lock is set. Data is written from the first client to the storage block. A version counter associated with the lock is updated using the first client. The first client is used to release the lock.

In one embodiment, the method includes waiting for a predetermined period of time after setting the activity element by a second client. If the version counter associated with the lock is not updated during the predetermined period of time, then the version counter is updated and the lock is released by the second client. If the version counter is updated during the predetermined period of time, then the second client clears the activity element. In one embodiment, the second client provides an input version counter value to the storage device, and if a state of the lock's version counter matches the input version counter value, then the second client updates the lock's version counter and releases the identified lock.

The lock may be acquired for shared use with other clients, for exclusive use by the acquiring client. If the lock is exclusively held by the first client, it may subsequently be forcibly acquired using the second client. The method includes resetting or otherwise modifying an expiration timer associated with the lock, and obtaining the state of an expiration timer associated with the lock.

In summary, device locks provide decentralized control of the shared data storage device on which they are located. Clients acquire the locks for excluding other clients, thereby maintaining data consistency, or for shared use by multiple clients. The device locks allow use of a serverless distributed architecture global file system (GFS). A serverless system allows higher speed data transfer across the network, eliminates the risk of server failure, and reduces system cost and complexity. Shared data storage better utilizes storage resources and simplifies redundant storage techniques. Moreover, no communication between clients is required to arbitrate for the shared resources. Direct attachment of a shared storage device to a client is susceptible to the risk of that client's failure; the present invention avoids this problem. A locally attached shared storage device also wastes a local host client's bandwidth by using it to transfer data to other clients; this is also avoided by the present invention. Moreover, data file size is not limited by the storage capacity available on any particular host client. Also, the present invention minimizes overhead steps for data transfer. These and other aspects of the invention will be apparent after reading the following detailed description of the invention and accompanying drawings.

BRIEF DESCRIPTION OF THE DRAWINGS

In the drawings, like numerals describe substantially similar components throughout the several views.

FIG. 8A is a block diagram illustrating generally one configuration of an array of locks.

FIG. 8B is a block diagram illustrating generally another configuration of an array of locks.

FIG. 9 is a table illustrating generally one possible sequence of events undertaken by a first client and a second client in accessing shared data.

FIG. 10 is a table illustrating generally another possible sequence of events undertaken by a first client and a second client in accessing shared data.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

In this document, the terms "client" or "clients" refers to a processing client, for example a microprocessor-based computer system, or any other device capable of communicating electromagnetic or other data signals.

In this document, the term "storage device" refers to any device or media capable of storing data, together with any peripheral circuits, including those associated with performing the function of storing, retrieving, or otherwise communicating data. The storage device can include either nonvolatile or volatile storage media including, but not limited to: electronic storage media such as dynamic random access memories (DRAMs), flash electrically erasable and programmable read-only memories (EEPROMs), magnetic tape or disk storage media (e.g., hard drive), electromagnetic or optical storage media, or any other analog, digital, or other data storage media or array of media.

In this document, the terms "node" or "nodes" refers broadly to any client, storage device, or other device that is communicatively coupled to a network or other communication interface.

In this document, the term "network" refers to any synchronous or asynchronous data transfer medium or other communication device, and can include any other "networks" to which a first "network" can be communicatively coupled. The network can provide wired or wireless communication, including, but not limited to: electrical coupling for communication of electrical signals, electromagnetic coupling for communication of electromagnetic/ optical signals, or using any other communicative coupling technique. In particular, the term "network" includes a "fibre channel interface," described below.

In this document, the term "computer readable medium" includes any storage device or network, as defined above, or any electronic device capable providing data, instructions, or commands.

In this document, the term "storage block" refers broadly to any unit of memory of any size or storage capacity. Multiple storage blocks may also be referred to collectively as a "storage block."

Overview of Global File System (GFS) for Shared Storage

Figure 1:
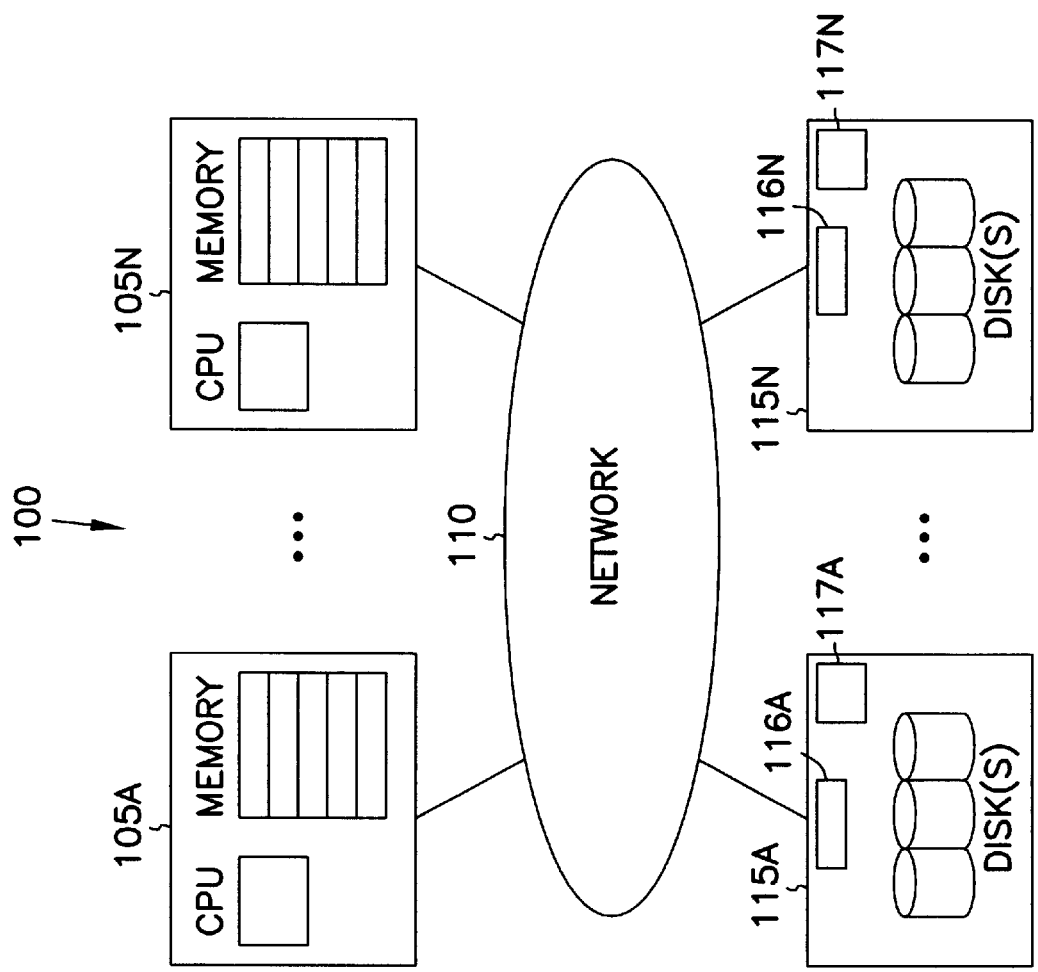
FIG. 1 is a block diagram illustrating generally one embodiment of a distributed file system for a shared storage architecture system according to one aspect of the present invention.

FIG. 1 is a block diagram illustrating generally, by way of example, but not by way of limitation, one embodiment of a distributed file system, referred to as a Global File System (GFS), for a shared storage architecture system 100 according to one aspect of the present invention. System 100 includes a plurality of computer or simply as clients 105. Each client 105 is communicatively coupled to a network 110. System 100 also includes at least one data storage device 115 shared by at least some of the clients 105. FIG. 1 illustrates, by way of example, but not by way of limitation, a plurality of storage devices 115A, . . . ,115N, such as disk media. Each is referred to generally as storage device 115. Each storage device 115 includes a communication interface that is communicatively coupled to the clients 105 through the network 110. Each storage device 115 includes, for example, data storage media and peripheral circuits. According to one aspect of the invention, data files stored on the storage media of one of the storage devices 115 are capable of being accessed by a plurality of the clients 105.

Characteristics of Shared Storage Architectures

According to another aspect of the invention, system 100 provides a distributed file system in which the clients 105 can access data stored on the shared storage devices 115. Such a shared storage architecture has several advantages over a message-based architecture in which clients 105 share only data stored on other clients 105. According to one aspect of the invention, the shared storage approach advantageously allows every client 105 uniform access to all storage devices 115. Also, individual clients 105 are not required to service requests for data from other clients 105, thereby freeing individual clients 105 for performing other tasks. Moreover, clients 105 are relatively unaffected by the failure of other clients 105 (i.e., a client 105 can still obtain data from a storage device 115 even if operation of other clients 105 is halted or suspended).

In one embodiment, accessibility and robustness of the shared storage devices 115 is improved by using a redundant array of independent and/or inexpensive disks (RAID) configuration of storage devices 115. A RAID configuration duplicates data on different ones of storage devices 115 for simultaneous access by different clients 105, thereby increasing the reliability of system 100. A RAID configuration provides redundancy in the event of a failure by one of storage devices 115, since redundant data is stored on others of the storage devices 115. In one embodiment of the present invention, storage devices 115 include command queuing for optimizing head seeks of a magnetic or other storage media, and further improving data throughput.

cl Eliminating the Server in a Shared Storage System

According to another aspect of the invention, system 100 is serverless. Clients 105 can access storage devices 115 directly, rather than through a server. In this respect, system 100 of the present invention is different from a traditional clientserver system, in which clients send requests to a server, which in turn provides data or metadata (i.e., data that describes other data) in response to the client requests. Servers can be implemented as general-purpose computers that can also execute other computing or graphics applications. Servers can also be implemented as dedicated computers performing only the specialized task of file serving, using a conventional standard such as Sun Microsystems' Network File System (NFS) and a protocol such as TCP/IP for communicating the data in messages across the network. System 100 of the present invention, however, eliminates the need for expensive server hardware and allows for faster communication of the data across network 110.

Characteristics of Message-Based Architectures

In a message-based system, several client computing nodes are intercoupled for communicating to each other via the network using a standard communication protocol, such as TCP/IP. Data stored locally at the clients can be shared with other clients by sending the data within messages carried across the network. Advantages of a message-based architecture include its extensibility and its portability to many platforms (e.g., Sun Microsystems, Inc.'s Network File System (NFS), or the Coda file system developed by Carnegie Mellon University). The high level message-based communication protocol allows a potentially large number of clients to be interconnected to the network.

While message-based systems perform well when data access is well balanced across the various clients, such load balancing is difficult to achieve because processing capability and workload typically varies between clients. Localization of data is difficult to maintain because the storage resources of particular ones of the clients will be more highly demanded than the storage resources of other ones of the clients. Using multiple copies of the data will decrease such problems, but at the increased cost of maintaining a data coherence mechanism. Furthermore, message-based systems obtain less benefit from high speed disk arrays, since the bandwidth of each client and storage device is limited to the bandwidth of the message-based network.

Message-based systems are also prone to failure of the file server or failure of the client-based storage devices. A server failure may render data inaccessible to all of the various clients. Redundant disk arrays at each client provide tolerance to failures of individual disks, but they do not protect against failures of the clients. Increased fault tolerance requires that software redundancy schemes be built into the file system.

Fibre Channel

Networks are characterized by how they connect clients, shared storage devices, or other nodes. For example, networks are characterized as shared media networks and point-to-point networks. Shared media networks (e.g., Ethernet) communicatively couple clients together via a common bus or ring. This allows only two nodes to communicate at a particular time. For example, in a token-ring configuration, various nodes may arbitrate for the ring by acquiring a token that excludes other nodes from using the ring. Alternatively, the nodes may simply send data over the ring without first acquiring a token or undertaking any other form of arbitration for the ring. If a collision of data is detected, the data is sent again. By contrast, point-to-point networks include switched networks having parallel interconnection paths between nodes. Multiple communication channels between separate nodes may operate simultaneously. This allows communication between more than two nodes at a particular time. Examples of communication over switched networks include Asynchronous Transfer Mode (ATM) and High Performance Parallel Interface (HIPPI).

Figure 2:
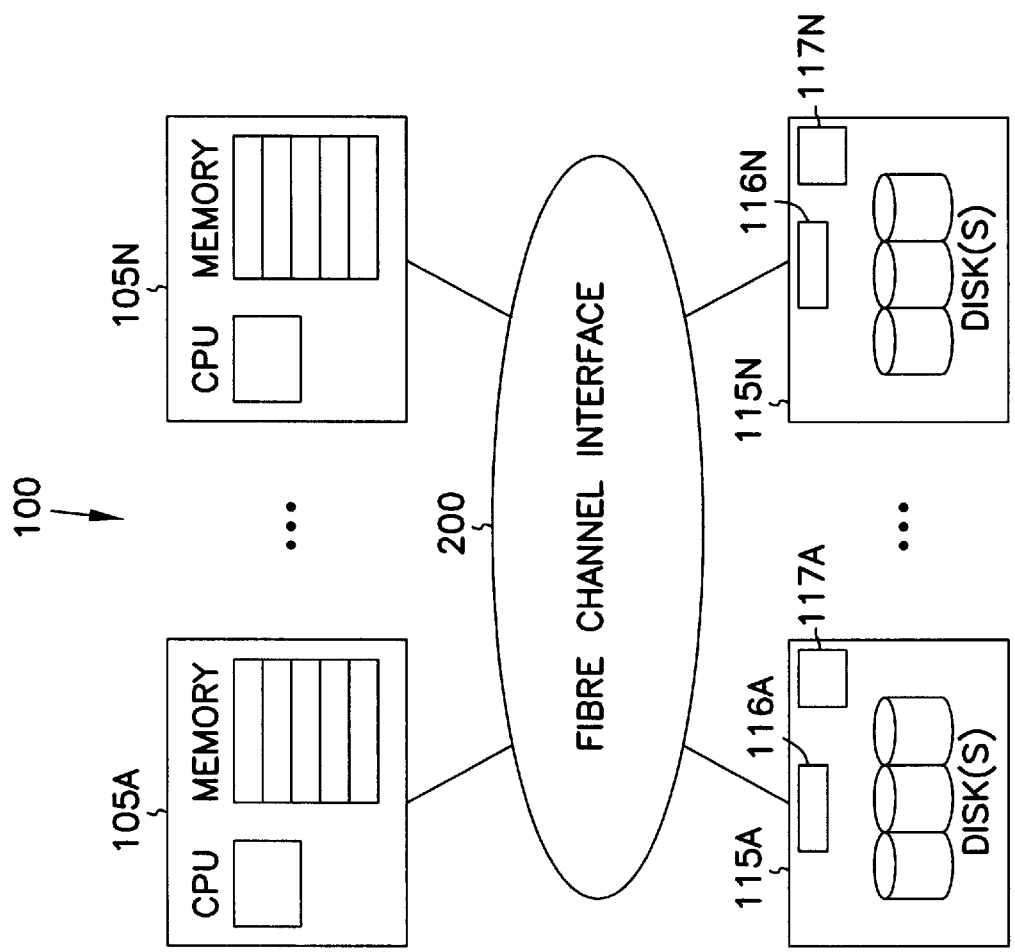
FIG. 2 is a block diagram illustrating generally one embodiment of the present invention using a fibre channel interface.

FIG. 2 is a block diagram illustrating generally, by way of example, but not by way of limitation, one embodiment of the present invention. This embodiment uses a particular kind of network 110, referred to as a fibre channel interface 200. One example of a serial fibre channel interface 200 is described in the American National Standards Institute (ANSI) X3T9.3 standard, available from ANSI, New York, N.Y., the disclosure of which is incorporated herein by reference. Fibre channel interface 200 combines the features of network (e.g., ATM or Fiber Distributed Data Interface (FDDI)) and storage interfaces (e.g., parallel Small Computer System Interface (SCSI) and Intelligent Peripheral Interface (IPI)). Fibre channel interface 200 also combines the extensibility of a message-based architecture with numerous advantages afforded by a shared storage device architecture.

Figure 3:
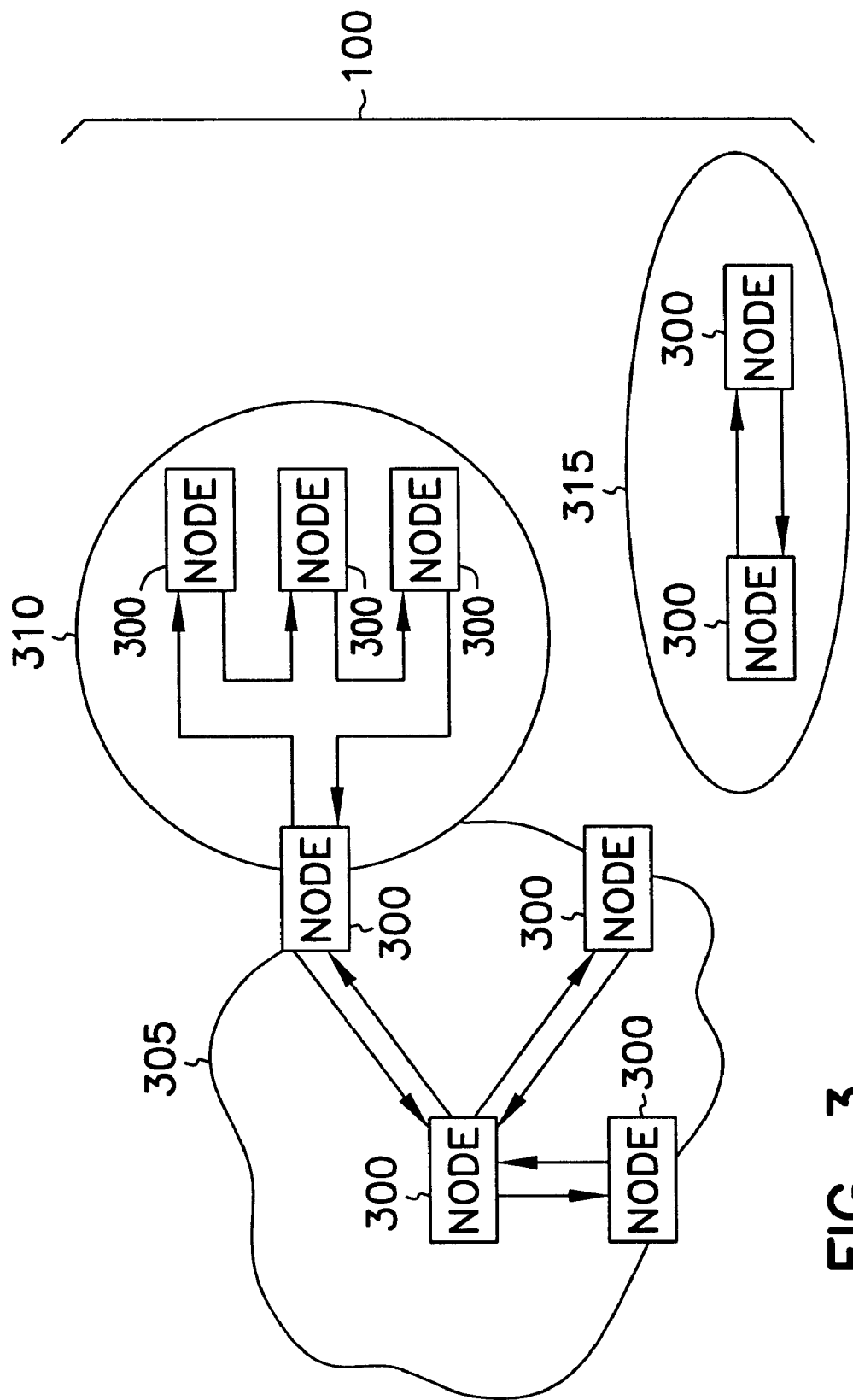
FIG. 3 is a block diagram illustrating conceptually several network interconnection configurations supported by the fibre channel interface.

FIG. 3 is a block diagram illustrating conceptually, by way of example, but not by way of limitation, several network interconnection configurations supported by fibre channel interface 200. Fibre channel interface 200 supports both ring and switched network interconnection topologies and provides scalable network-attached storage. In FIG. 3, a plurality of ports or nodes 300 are communicatively intercoupled, such as in a point-to-point configuration 305, an arbitrated loop configuration 310, and a ring configuration 315. Moreover, these configurations may themselves be interconnected, for example, point-to-point configuration 305 is illustrated as being interconnected to arbitrated loop configuration 310. In this way, fibre channel interface 200 allows a plurality of parallel connections to be aggregated through a shared port or node 300 with another plurality of similarly or differently configured connections, thereby offering nearly unlimited scalability and extensibility.

In one embodiment, by way of example, but not by way of limitation, fibre channel interface 200 includes up to 126 nodes that are connected in a single loop, as illustrated conceptually by arbitrated loop configuration 310. By comparison, a SCSI interface typically only allows a more limited number of nodes (e.g., 7 nodes for SCSI-1 and 16 nodes for SCSI-2) to be daisy-chained in an arbitrated loop configuration. Thus, the scalability of fibre-channel interface 200 typically significantly exceeds that of a parallel SCSI interface. Moreover, one embodiment of fibre channel interface 200 allows peak transfer rates that exceed 100 megabytes per second. Other planned embodiments of fibre-channel interface 200, include peak transfer rates of 400 megabytes per second. As set forth above, fibre channel interface 200 provides high speed data transfer as well as scalability with respect to both bandwidth (e.g., the peak transfer rate) and the number of devices that can be interconnected. In one embodiment, by way of example, but not by way of limitation, various nodes 300 are linked to each other by fiber optics having link lengths of up to 10 kilometers. In another embodiment, by way of example, but not by way of limitation, various nodes 300 are linked to each other by copper wire having link lengths of up to 25 meters.

GFS Example Embodiment

Figure 4:
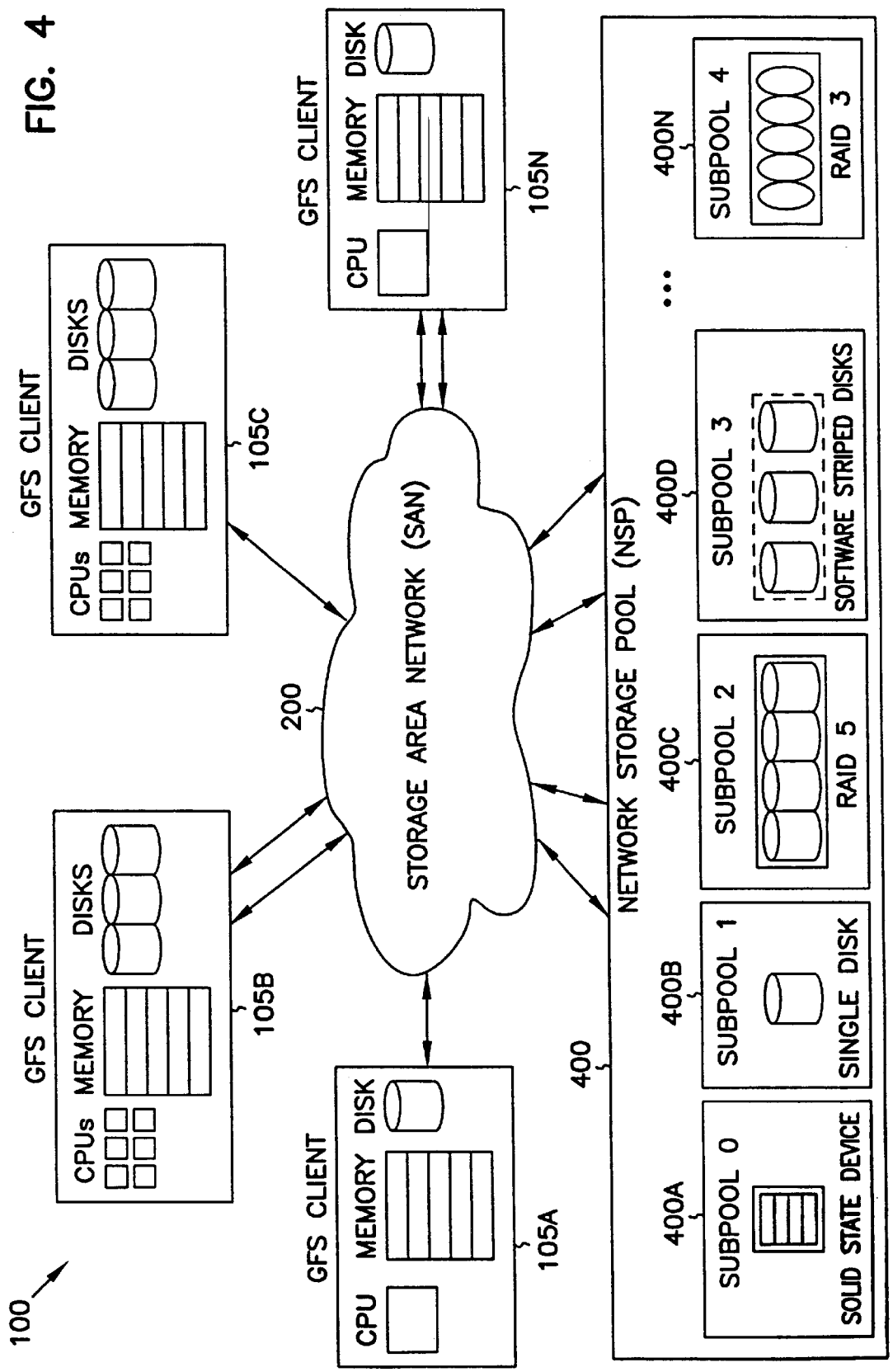
FIG. 4 is a block diagram illustrating conceptually one embodiment of a GFS architecture according to one aspect of the present invention.

FIG. 4 is a block diagram illustrating conceptually, by way of example, but not by way of limitation, one embodiment of a system 100 using one embodiment of a GFS architecture. In FIG. 4, system 100 includes a plurality of clients 105A–N, communicatively intercoupled by a network 110, referred to as a Storage Area Network (SAN). One embodiment of network 110 includes fibre channel interface 200. System 100 also includes a Network Storage Pool (NSP) 400.

Network Storage Pool 400 includes one or more network attached storage devices that are capable of being shared by a plurality of computer processing or other clients 105. According to one aspect of the invention, Network Storage Pool 400 includes a collection of network attached storage devices that are logically grouped to provide clients 105 with a unified shared storage space. In one embodiment, Network Storage Pool 400 is not owned or controlled by any one of clients 105. Instead, this embodiment allows Network Storage Pool 400 to provide shared storage that is capable of being used by all clients 105 or other nodes attached to network 110.

In the embodiment illustrated in FIG. 4, Network Storage Pool 400 includes at least one subpool, such as the plurality of subpools 400A–N illustrated by way of example in FIG. 4. According to one aspect of the invention, each of subpools 400A–N inherits attributes characteristic of the underlying hardware or storage media providing data storage. In one embodiment, for example, subpool 400A is a solid state device providing volatile or nonvolatile storage, such as a static random access memory (SRAM), dynamic random access memory (DRAM), flash electrically erasable and programmable read-only memory (EEPROM), or other integrated circuit memory device. In another example, subpool 400B includes a magnetic or optical disk, tape, or other such storage device. In another example, subpool 400C is a disk array in a RAID-5 configuration (e.g., data is striped block-by-block across multiple disks, and parity data is also spread out over multiple disks). In another example, subpool 400D includes an array of software striped disks. Striping spreads sequentially accessed data across many disks so that multiple disks can be accessed in parallel to increase performance. Striping is typically performed by a hardware RAID controller. However, striping can also be performed by the client computer, which is referred to as software striping. In a further example, subpool 400N is a disk array in a RAID-3 configuration (e.g., data is striped byte-by-byte across multiple disks and a single additional disk is dedicated to recording parity data). Other RAID configurations or other redundant data storage schemes can also be used.

In FIG. 4, Network Storage Pool 400 is illustrated conceptually as providing shared network attached storage that is capable of being used by a plurality of the clients 105. The clients 105 are allowed direct channel data transfer with the storage devices 115 in the subpools of Network Storage Pool 400. This approach should be contrasted with message-based distributed file systems. Message-based distributed file systems require a server that acts as an intermediary, thereby masking some of the attributes of the storage devices 115 (e.g., not fully utilizing the speed of a solid state storage device as illustrated by subpool 400A).

In one embodiment, Network Storage Pool 400 comprises network attached storage devices 115 that are physically separate from ones of the clients 105, as illustrated in FIG. 2. In another embodiment, Network Storage Pool 400 includes some storage devices 115 that are physically located together with ones of the clients 105, but accessible for use by others of the clients 105. In a further embodiment, Network Storage Pool 400 includes some storage devices 115 that are physically located together with ones of the clients 105, and other storage devices 115 that are physically located elsewhere. All of the storage devices 115 or subpools 400A–N are capable of being accessed by a plurality of the clients 105.

This embodiment of system 100 advantageously provides large data storage capacity and high bandwidth for data transfer, such as for multimedia, scientific computing, visualization, and other suitable applications. In one example, system 100 includes the GFS distributed file system, and is implemented in the IRIX operating system by Silicon Graphics, Inc. (SGI) of Mountain View, Calif., under the Virtual File System (VFS) interface. VFS permits an operating system to simultaneously support multiple file systems. In this embodiment, the GFS is accessed using standard Unix commands and utilities.

In one embodiment of system 100, data is cached in the main memories of the computer processing or other clients 105 only during input/output (I/O) request processing. For example, after each data request by a client 105, a copy of the data is transferred from the Network Storage Pool 400 to the client 105. After the client 105 reads the data, the data is released (e.g., other clients 105 are allowed to access the storage blocks in the Network Storage Pool 400 that contain the data). If the client 105 has modified the data, the modified data is written back from the main memory of the client 105 to the Network Storage Pool 400 (e.g., after which other clients 105 are allowed to access the storage blocks in the Network Storage Pool 400 that contain the data).

According to another aspect of the invention, for example, GFS caches data to exploit locality of reference on the storage devices 115 comprising Network Storage Pool 400, such that successive I/O requests access data that is clustered together in storage. GFS informs the clients 105 on each I/O request of what data is appropriate to cache, such as metadata and frequently-accessed small files (e.g., directories). In one embodiment, consistency between the copy of the data cached at the client 105 and the original data maintained in the Network Storage Pool 400 is maintained by data storage device locks. The device locks facilitate atomic read, modify, and write operations, and are implemented by a controller, microprocessor, or other peripheral circuit included within ones of the storage devices 115 forming the subpools of Network Storage Pool 400. Each device lock gives a particular client 105 exclusive access to one or more storage blocks residing on the storage media of a storage device 115 and controlled by the device lock. Other clients 105 are usually excluded from accessing the locked one or more storage blocks until the particular client releases the lock. According to one aspect of the present invention, the device locks provide the an easy-to-use decentralized data consistency mechanism. According to another aspect of the invention, the device locks provide a robust data consistency mechanism. Because the locks are distributed across a large number of storage devices 115, they are less susceptible to failure. According to a further aspect of the invention, no messages need be passed between clients 105 in order to maintain data consistency.

Some GFS Advantages

According to one aspect of the invention, system 100 includes a distributed architecture file system (e.g., GFS) that eliminates the master/slave architecture found in most present distributed client/server computing environments. In one embodiment, system 100 includes a plurality of clients 105 that access storage devices 115 through a network 110. One example of a fast switched network 110 includes fibre channel interface 200, providing low time latency for accessing data and high bandwidth for communicating data. Other examples of network 110 include, but are not limited to: a fast bus, multistage network, or crossbar switch. The present invention includes many advantages, such as described below.

For example, one aspect of the invention provides a storage architecture that allows a storage system designer and administrator to pool disk drives and other storage devices into a shared disk memory in Network Storage Pool 400 or other shared data storage arrangement. This provides better utilization of storage resources. This also accommodates redundancy (e.g., RAID) across various ones of the storage devices in Network Storage Pool 400. Moreover, building redundancy into a disk array, according to the present invention, is easier to accomplish than existing techniques for insuring that a complicated server (including associated hardware, software, and network connections) does not fail.

According to another aspect of the invention, Network Storage Pool 400 provides shared storage resources that are substantially equally accessible to each of clients 105. The present invention obtains this advantage without using a server or other intermediation. Neither does the present invention require communication between clients 105 while arbitrating for use of the shared storage resources in Network Storage Pool 400.

Another aspect of the invention provides a more robust system by eliminating the problem of having a single point-of-failure that exists when a shared storage device is attached to a single host client 105. In such a case, if the host client fails, the shared storage device becomes unavailable to the other clients 105. By contrast, in the present system, if a client 105 fails, the shared storage devices 115 in Network Storage Pool 400 are still available for other clients 105 to access.

Another aspect of the invention exploits bandwidth capabilities both within and across next-generation personal computers (PCS), desktop workstations, high-performance servers, and supercomputers. For example, the present invention does not require that the bandwidth of a local host client 105 be wasted in transferring data from a locally attached storage device to another host client 105.

According to another aspect of the invention, the size of the distributed architecture file system, GFS, and consequently, the size of a single file, is not limited by the storage capacity available on any particular host client. In one embodiment, GFS spans multiple storage devices 115.

According to a further aspect of the invention, each client 105 that is coupled to the network 110 effectively views the network attached storage devices 115 as being locally attached. Thus, GFS provides a more direct connection between client 105 and storage device 115 by bypassing protocol stack overheads. Table 1 illustrates exemplary steps required for accessing a file using a file system such as NFS. Table 2 lists exemplary steps required for accessing a file using a file system such as GFS. As seen by comparing Tables 1 and 2, the GFS file system of the present invention requires less overhead steps than NFS.

TABLE 1

Steps For Accessing Files Using NFS

| Step | Where performed |
|---|---|
| NFS | Client |
| XDR/RPC | Client |
| TCP/IP | Client |
| Ethernet | Network |
| TCP/IP | Server |
| NFS | Server |
| VFS | Server |
| SCSI Driver | Server |
| SCSI Connection | Server |
| Disk Access | Server |

TABLE 2

Steps For Accessing Files Using GFS

| Step | Where Performed |
|---|---|
| GFS | Client |
| SCSI Driver | Client |
| SCSI on Fibre Channel | Client |
| Disk Access | Client/Network |

GFS File System Structure

Figure 5:
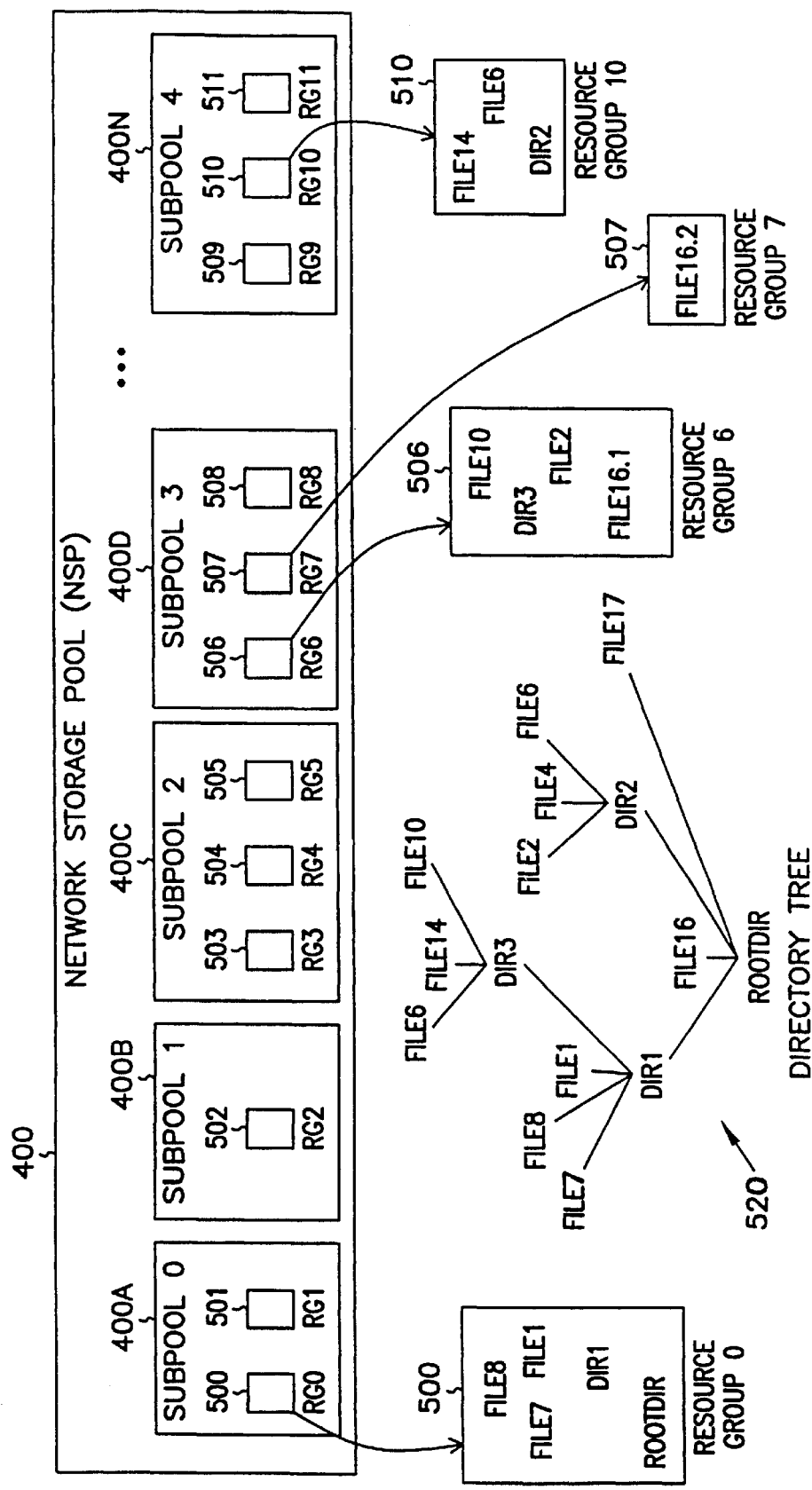
FIG. 5 is a conceptual diagram illustrating generally one embodiment of a GFS file system mapping structure according to one aspect of the present invention.

FIG. 5 is a conceptual diagram illustrating generally, by way of example, but not by way of limitation, one embodiment of a GFS distributed file system mapping structure according to one aspect of the present invention. In FIG. 5, storage capacity in the various subpools of Network Storage Pool 400 is partitioned into several resource groups (RGs), such as resource groups 500–511. According to one aspect of the invention, resource groups 500-511 are designed to distribute file system resources across the aggregation of storage subpools in Network Storage Pool 400. Each storage device 115 can include a single one of resource groups 500–511 or a plurality of the resource groups 500–511. In one embodiment, one or more resource groups 500–511 is distributed (e.g., using striping techniques) across different storage devices 115 or subpools 400A–N within Network Storage Pool 400.

FIG. 5 also illustrates a hierarchical or other organizational arrangement such as, by way of example, but not by way of limitation, directory tree 520. File data and metadata may span multiple ones of resource groups 500–511 and/or subpools 400A–N. Directory tree 520 illustrates one example of how files are mapped from a UNIX directory tree 520 to ones of resource groups 500–511 located on different ones of subpools 400A–N. A single file, such as file16, may include portions located on different ones of resource groups 500–511. In the illustrated example, a first portion of file16 (i.e., file16.1) resides on resource group 506 and a second portion of file16 (i.e., file16.2) resides on resource group 507.

According to one aspect of the invention, at least one of resource groups 500–511 contains information similar to that of a conventional superblock (e.g., number of blocks in the file system, how many blocks are used for meta data, how many blocks are used for data, bitmaps that indicate which blocks are in use, and the time that the file system was created). In one embodiment, the GFS distributed file system includes a superblock that contains certain information that is not distributed across resource groups 500–511, but is instead stored upon a particular one of resource groups 500–511. Information carried by the superblock includes, for example, the number of clients 105, storage devices 115, or other nodes mounted on the GFS file system. Such information also includes, for example, bitmaps for calculating unique identifiers associated with each node and identifying the particular one of subpools 400A–N on which the GFS file system is mounted. The information carried by the superblock also includes a static resource group index. The resource group index describes the location of each of resource groups 500–511 as well as their attributes and configuration (e.g., their hardware characteristics).

According to one aspect of the invention, the data storage capacity of one or a group of storage devices 115 of system 100 is aggregated into shared Network Storage Pool 400. Network Storage Pool 400 is partitioned into resource groups (e.g., illustrated by resource groups 500–511). Resource groups 500–511 are divided into a plurality of data storage capacity units referred to as data blocks, storage blocks, or data storage blocks. The size of the data storage capacity units is userconfigurable (e.g., 512 bytes, 4 kilobytes, 32 kilobytes, etc.).

Figure 6:
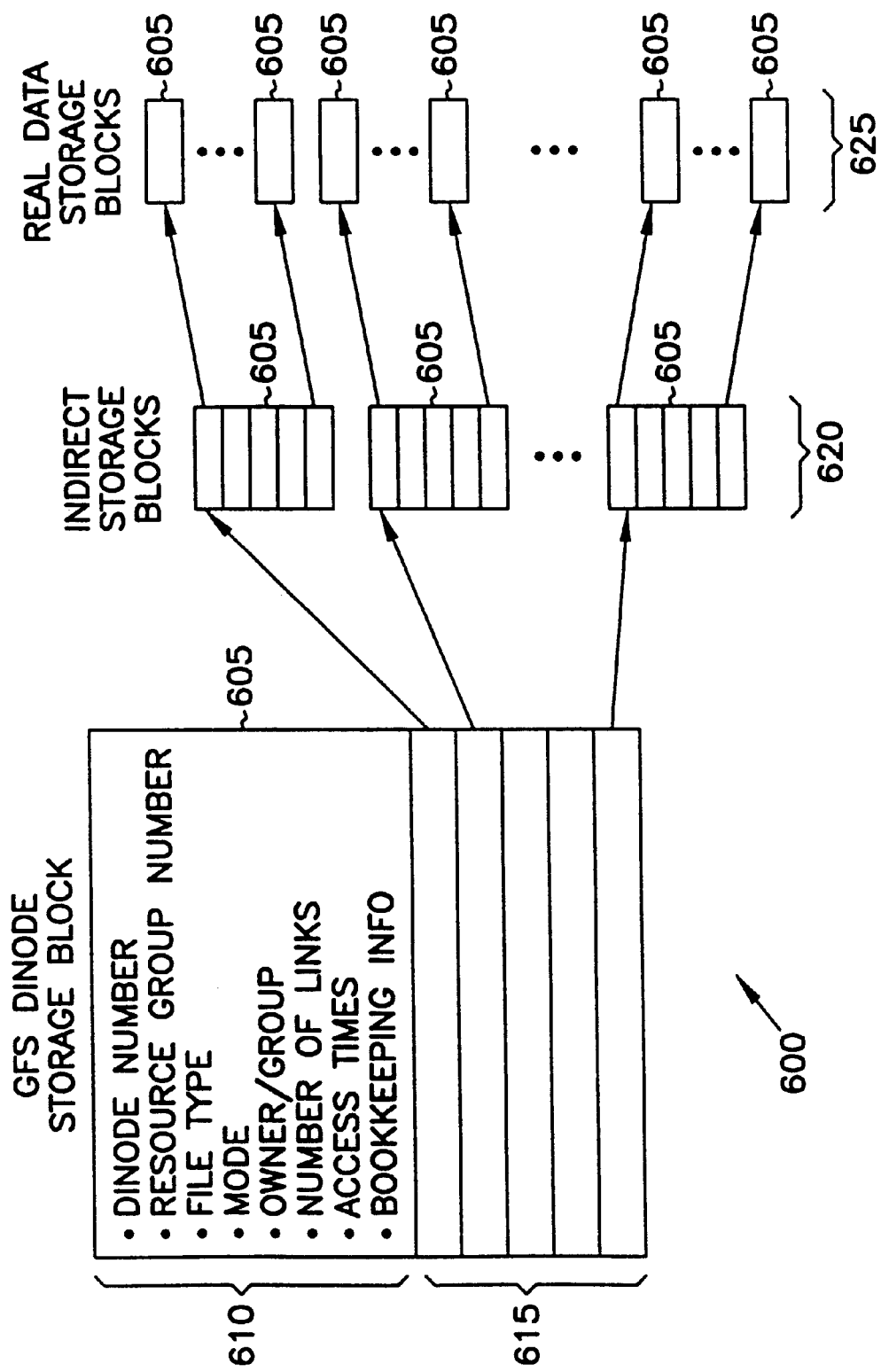
FIG. 6 illustrates generally one embodiment of certain GFS file system constructs.

FIG. 6 illustrates generally, by way of example, but not by way of limitation, one embodiment of certain GFS file system constructs in which resource groups 500–511 essentially provide mini-file systems. For example, each of resource groups 500–511 includes at least one information block, at least one data bitmap, and optionally include at least one GFS dinode (disk index node) providing a unique pointer to a particular data file. The sharing of a single storage block 605 by multiple diodes 600 may be inefficient in the distributed GFS file system. As a result, in one embodiment of the present invention, only one dinode 600 resides on a particular GFS file system storage block 605. Dinode 600, however, does not necessarily occupy the entire storage block 605.

Dinode 600 includes a header section 610 and a data section 615. Header section 610 includes information about the particular data file. Data section 615 either includes real data (e.g., if the entire file can be fit into the storage block 605 carrying dinode 600) or a set of pointers (categorized as metadata) to other storage blocks 605. According to another aspect of the present invention, a uniform maximum indirection depth is associated with each dinode 600. By contrast, conventional UNIX inodes (index nodes) have a maximum indirection depth that can vary between inodes.

For example, FIG. 6 illustrates a dinode 600 having a single level of indirection. In this example, reading data from the file includes reading the dinode 600 and reading the pointers carried in its data section 615. The pointers carried in data section 615 of dinode 600 point to indirect storage blocks 620, which contain pointers to real data storage blocks 625. Thus, only one level of indirect storage blocks 620 must be traversed in order to access real data storage blocks 625. As a result, dinode 600 is referred to as having a single level of maximum indirection. A different level of maximum indirection is also included within the present invention (e.g., 2 or more levels of maximum indirection depth). According to one aspect of the present invention, however, the actual level of maximum indirection associated with each dinode 600 is the same. However, particular dinodes 600 need not utilize the maximum indirection depth. For example, a dinode 600 associated with a very small file may include all of the file's real data within its data section 615, without requiring any reference at all to other storage blocks 605, such as indirect storage blocks 620, and real data storage blocks 625.

Storing a file in the data section 615 of dinode 600 is referred to as dinode stuffing. Dinode stuffing compensates for internal fragmentation of data storage resulting from allocating only a single dinode 600 per storage block 605. Another advantage of dinode stuffing is that it allows stuffed files to be transferred with a single storage block request. Directory lookups often benefit from dinode stuffing because each pathname traversal requires at least one directory file read. When directory information is stuffed into a single dinode 600, the number of storage block requests associated with a directory lookup can be decreased by as much as one-half.

In one example, the unit size of a storage block 605 is 32 kilobytes, the dinode header 610 requires 128 bytes, and the dinode 600 has 1 level of maximum indirection. In this example, reading a 1 byte file requires a total of 64 kilobytes of storage capacity. This example also requires at least 2 block transfers of data from the disk in order to read the dinode 600 and associated indirect real data storage block 625. By contrast, if the same file is stuffed in the dinode 600, only 32 kilobytes of storage capacity and a single block transfer of data is required. For a 32 kilobyte block size and 128 byte dinode header 610, up to 32,640 bytes can be stuffed in the dinode 600. If the file size increases beyond this, the GFS file system unstuffs the dinode 600.

According to one aspect of the invention, the GFS file system assigns UNIX inode numbers based on the disk address of the storage device 115 to which a dinode 600 is assigned. Directories contain file names and accompanying UNIX inode numbers. A directory lookup by the GFS file system matches a file name to an inode number. Then, the GFS file system locates the dinode 600 using the corresponding UNIX inode number. In one embodiment, by assigning disk addresses to UNIX inode numbers, GFS dynamically allocates dinodes 600 from a pool of free storage blocks 605.

In summary, UNIX inodes are associated with tree structures with real data storage blocks at the leaves. For a particular UNIX inode, the leaves may be different in height (i.e., there is no uniformity in indirection depth either within the tree associated with a particular UNIX inode, or between trees associated with different UNIX inodes). Similarly, unstuffed GFS dinodes 600 are also associated with tree structures having real data storage blocks 625 at the leaves, as illustrated in FIG. 6. According to one aspect of the present invention, however, all the leaves are uniform in height (e.g., indirection depth of the GFS dinode is relatively uniform both within the tree associated with the particular GFS dinode 600, and between trees associated with different UNIX dinodes). The tree associated with the GFS dinode 600 of FIG. 6 advantageously offers more uniformity in accessing real data. For any file offset, the GFS file system uses the same number of pointer indirections through metadata to reach real data. Uniform tree heights simplify the implementation of the GFS file system and provide regularity in data access times. Moreover, further data access speed is obtainable for small files through dinode stuffing, as explained above.

Device Lock Overview

Figure 7:
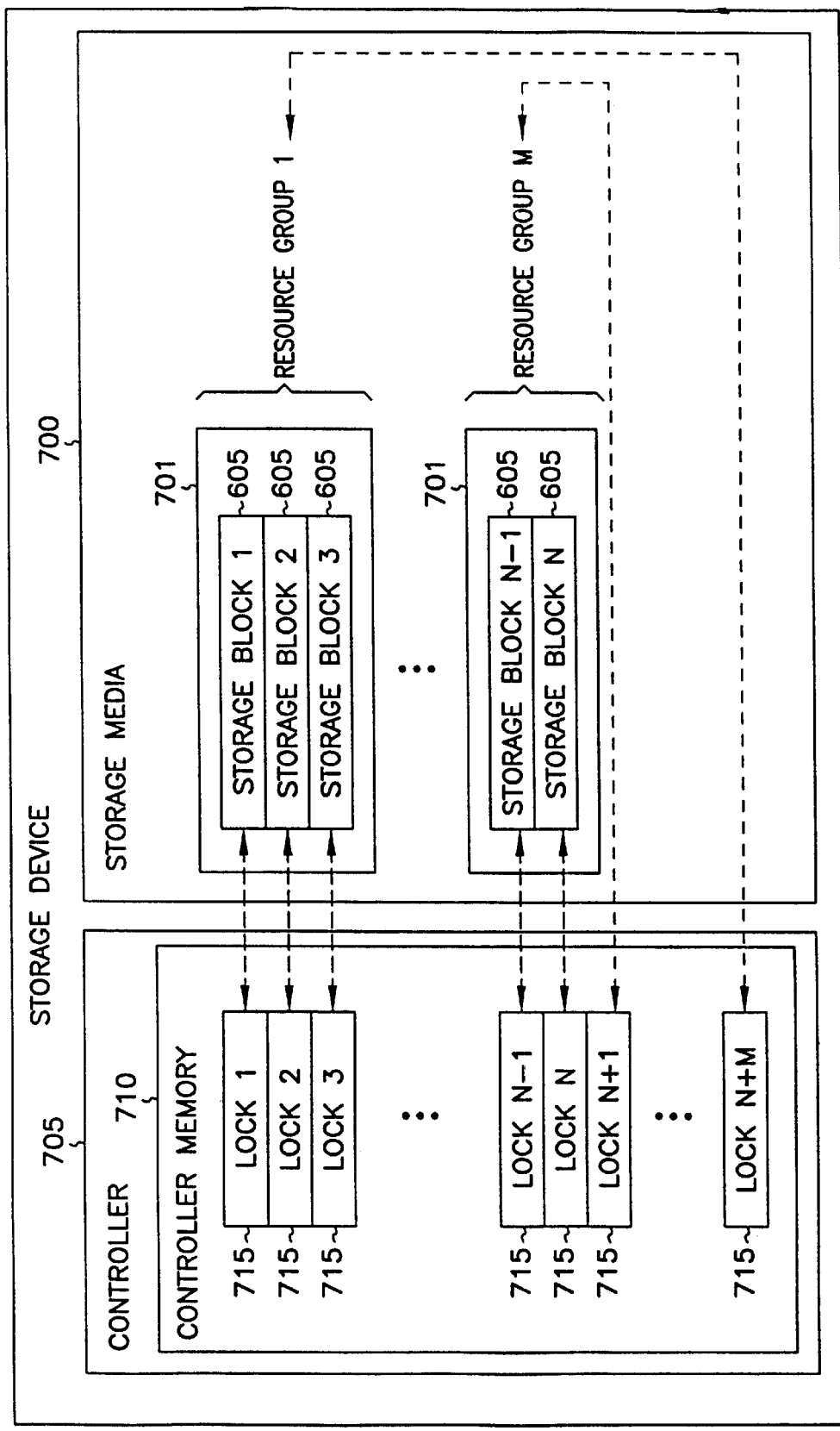
FIG. 7 is a block diagram illustrating generally one embodiment of a storage device in which locks are provided for controlling access to data storage blocks, such as for maintaining data consistency.

FIG. 7 is a block diagram illustrating generally, by way of example, but not by way of limitation, one embodiment of a storage device in which locks are provided for controlling access to data storage blocks. Storage device 115 includes storage media 700 and controller 705. Storage media 700 includes a plurality of N storage blocks 605, which are partitioned into M resource groups 701 in this example. Controller 705 includes a microprocessor or similar circuit configured for operating storage device 115 and communicating with fibre channel interface 200 or other network 110. Controller 705 also includes a controller memory 710, providing at least one data storage device lock mechanism 715 (also referred to as a "lock" or a "device lock") controlling the use of a corresponding storage block 605 by different clients 105. In one embodiment, controller memory 710, carrying locks 715, is faster to access than storage media 700, carrying storage blocks 605. In another embodiment, controller memory 710, carrying locks 715, provides volatile data storage (e.g., RAM) and storage media 700, carrying storage blocks 605, provides nonvolatile data storage.

Locks 715 are "acquired" by a particular client 105, thereby usually excluding other clients from accessing the corresponding storage block 605 controlled by the lock 715 until the lock 715 is "released" by the particular client. Locks 715 provide a mechanism for mutual exclusion of storage capacity, such as provided by storage device 115, that is shared by multiple clients 105. As explained below, locks 715 offer a highly parallel mutual exclusion mechanism effected by a plurality of clients 105, rather than by a single centralized server. As also explained below, locks 715 require little overhead storage capacity on the storage device 115. Moreover, locks 715 provide graceful recovery from failures, as explained below.

In the embodiments of FIGS. 6 and 7, a lock 715 is assigned to each storage block 605 and a lock 715 is also assigned to each resource group 701. However, there are many other arrangements of assigning locks 715 to storage blocks 605. Such arrangements will be based, in part, on the amount of controller memory 710 that is available for implementing the locks 715. In one embodiment, each lock 715 requires as little as 1 to 4 bytes of controller memory 710, such that controller memory 710 supports thousands of locks 715 (e.g., between 1024 locks and 16384 locks). In such a configuration, the finite number of locks 715 may require that individual locks 715 not be assigned to each file, the number of which may exceed the number of available locks 715. In this case, individual locks 715 may instead be assigned to each storage block 605. In another example, a lock 715 is assigned to each resource group 701 (i.e., locks 715 are not dedicated to individual storage blocks 605). This requires even less controller memory 710. In this way, storage blocks 605 can be grouped together and assigned to a particular lock 715. If the GFS file system includes a superblock, having file system information and carried on one of the storage devices 115, a separate lock 715 can be assigned to the superblock.

The GFS distributed file system uses the locks 715 to maintain access control of real data or file system metadata located on shared resources such as shared storage devices 115. Locks 715 are also capable of providing coherence between data that is cached in more than one location. Locks 715 are implemented on the storage devices 115 and accessed by clients 105 with an SCSI command for locking one or more storage blocks or resource groups. This SCSI command is referred to as the DLock command. According to one aspect of the invention, the DLock command is independent of all other commands in the SCSI command set, such that the storage devices 115 supporting the locks 715 have no awareness of the nature of the resource or data that is locked. In other words, it is the GFS distributed file system and not the storage device 115 that maps the locks 715 to the resource controlled.

Example 1: Lock Structure

FIG. 8A is a block diagram illustrating generally, by way of example, but not by way of limitation, one configuration of an array of locks 715. In this embodiment, the array of locks 715 are indexed by a lock identification (ID) number for identifying particular locks 715 in the array. Each lock 715 includes fields such as Lock[ID].activity, providing an activity element 800, Lock[ID].state, providing a state element 805, and Lock[ID].version, providing a version counter 810. In one embodiment, activity element 800 and state element 805 are each implemented as single bits, referred to as an activity bit and a state bit, respectively. Version counter 810, which is also referred to as a "counter" or "clock", typically includes a plurality of bits (e.g., 22 bits, 30 bits, or any other number of bits). According to one aspect of the invention, each lock 715 controls access to corresponding storage capacity, such as one or more storage blocks 605 or resource groups 701 of storage blocks 605.

Example 1: Device Lock Actions

According to one aspect of the invention, the SCSI DLock command is initiated by one of the clients 105, and communicated to the storage device 115 over the fibre channel interface 200 or other network 110. Input parameters of the DLock command include a lock identification (e.g., a lock number referred to as ID) and an action. The ID parameter identifies a particular lock 715, in a storage device's 115 array of locks 715, on which to perform an action. The DLock command's action parameter, which is selected from an action set described below, determines the action to be performed on the lock 715. Table 3 describes, by way of example, but not by way of limitation, one action set for performing various actions on the lock 715.

In one embodiment, the Lock action checks the state element 805 of the particular lock 715 identified by the lock ID. If the state element 805 is set (i.e., contains a "1" hex), the identified lock 715 has been acquired by one of the clients 105. Other clients 105 are excluded from accessing the one or more storage blocks 605 corresponding to the identified lock 715 if the state element 805 is set. A return parameter (i.e., Return.Result of "0" hex) informs the initiating client 105 that the identified lock 715 has already been acquired. Otherwise, if the state element 805 is

TABLE 3

Example 1 of One Embodiment Of DLock Actions

| Action | Description of Action |
| --- | --- |
| Lock | Test-and-Set Action<br>if (Lock[ID].state = 1)<br>  then<br>    Return.result ← 0<br>  else<br>    Return.result ← 1<br>    Lock[ID].state ← 1 |
| Unlock | Clear Action<br>Return.result ← 1<br>Lock[ID].state ← 0<br>if (Lock[ID].activity = 1)<br>  then<br>    Increment Lock[ID].version |
| Unlock Increment | Clear Action<br>Return.result ← 1<br>Lock[ID].state ← 0<br>Increment Lock[ID].version |
| Reset Lock | Conditional Clear Action<br>if (Lock[ID].version = (input version value))<br>  then<br>    Return.result ← 1<br>    Lock[ID].state ← 0<br>    Increment Lock[ID].version<br>  else<br>    Return.result ← 0 |
| Activity On | Turn On Activity Monitor<br>Lock[ID].activity ← 1<br>Return.result ← 1 |
| Activity Off | Turn Off Activity Monitor<br>Lock[ID].activity ← 0<br>Increment Lock[ID].version<br>Return.result ← 1 |
| No Operation | No Operation<br>Return.result ← 1 |
| Included with each of Lock, Unlock, Unlock Increment, Reset Lock, Activity On, Activity Off, and No Operation actions | After Each Action<br>Return.state ← Lock[ID].state<br>Return.activity ← Lock[ID].activity<br>Return.version ← Lock[ID].version | not set (i.e., contains a "0" hex), the identified lock 715 has not currently been acquired by one of the clients 105. The one or more storage blocks 605 corresponding to the identified lock 715 is available for use by the initiating client 105. In this case, the Lock action sets the state element 805 of the identified lock 715 (i.e., sets Lock[ID].state to a "1" hex). This acquires the identified lock 715 for the initiating client 105, and excluding other clients 105 from accessing the one or more storage blocks 605 controlled by the identified lock 715. A return parameter (i.e., Return.Result of "1" hex) informs the initiating client 105 that it has successfully acquired the identified lock 715, and may access the corresponding one or more storage blocks 605.

In one embodiment, the Unlock action is used for releasing an identified, previously acquired lock 715 and, if the activity element 800 is set, updating the version counter 810 of the identified lock 715 (e.g., incrementing Lock[ID].version). The identified lock 715 is released by clearing its state element 805 (i.e., by setting Lock[ID].state to "0" hex). This releases the identified lock 715 and allows access to the corresponding one or more storage blocks 605 by any client 105. If the activity element 800 is set, the version counter 810 is updated (i.e., Lock[ID].version is incremented). A return parameter (i.e., Return.Result of "1" hex) informs the initiating client 105 that it has successfully released the identified lock 715.

In one embodiment, the Unlock Increment action is also used for releasing an identified, previously acquired lock 715 and, regardless of whether the activity element 800 is set, updating the version counter 810 of the identified lock 715 (i.e., incrementing Lock[ID].version). The identified lock 715 is released by clearing its state element 805 (i.e., by setting Lock[ID].state to "0" hex). This releases the identified lock 715 and allows access to the corresponding one or more storage blocks 605 by any client 105. A return parameter (i.e., Return.Result of "1" hex) informs the initiating client 105 that it has successfully released the identified lock 715.

In one embodiment, the Reset Lock action performs a conditional clear action. The initiating client 105 provides the storage device 115 with two input parameters: an ID and an input version counter value. If the value of the version counter 810 associated with the identified lock 715 matches the input version counter value (i.e., Lock[ID].version=(input version value)), then the identified lock 715 is released by clearing its state element 805 (i.e., by setting Lock[ID].state to "0" hex). This releases the identified lock 715 and allows access to the corresponding one or more storage blocks 605 by any client 105. A return parameter (i.e., Return.Result of "1" hex) informs the initiating client 105 that it has successfully released the identified lock 715. If the value of version counter 810 does not match the input version counter value (i.e., Lock[ID].version≠(input version value)), then the identified lock 715 is not released, and a return parameter (i.e., Return.Result of "0" hex) informs the initiating client 105 that the identified lock 715 was not released.

In one embodiment, the Activity On action turns on activity monitoring. The activity element 800 (Lock[ID].activity) of a particular lock 715 is normally not set. According to one aspect of the invention, if the initiating client 105 has not modified its local copy of the data stored on the one or more storage blocks 605 corresponding to the identified lock 715, it uses the Unlock action when it releases the identified lock 715. Since the activity element 800 is not set, the version counter 810 is not incremented. However, if the initiating client 105 has modified its local copy of the data stored on the one or more storage blocks 605 controlled by the identified lock 715, it first writes back the modified data to the corresponding one of more storage blocks 605. Then, the client 105 releases the identified lock 715 using the Unlock Increment action. The Unlock Increment action increments the version counter 810, even though the activity element 800 is not set. In this way, a change in the state of the version counter 810 indicates to other clients 105 that modified data has been stored in the one or more storage blocks 605 controlled by the identified lock 715.

Activity monitoring is invoked by the Activity On action, which sets the activity element 800 of the identified lock 715 (i.e., Lock[ID].activity is set to "1" hex) A return parameter (i.e., Return.Result of "1" hex) informs the initiating client 105 that it has successfully invoked activity monitoring. During activity monitoring, version counter 810 of the identified lock 715 is incremented upon execution of either of the Unlock or Unlock Increment actions. A client 105 that repeatedly tries and fails to acquire an already-acquired identified lock 715 can turn on activity monitoring for a predetermined period of time to determine whether: (1) the identified lock 715 is being acquired and released by one or more other clients 105 without data modification; or (2) the identified lock 715 has been acquired by a particular client 105 that has failed, been taken off-line, or has otherwise become indisposed, without first releasing the identified lock 715. In first case, the version counter 810 of the identified lock 715 will show activity (i.e., the version counter will be updated since the corresponding activity element 800 is set). In the second case, the version counter 810 of the identified lock 715 will not have been updated over the monitoring time period. In this case, the client 105 that turned on activity monitoring can then forcibly release the identified lock 715, such as by using the Release Lock action.

In one embodiment, the Activity Off action turns off activity monitoring by updating the version counter 810 (e.g., incrementing Lock[ID].version) and clearing the activity element 800 (i.e., setting Lock[ID].activity to "0"). A return parameter (i.e., Return.result of "1") informs the initiating client 105 that the activity element 800 has been successfully cleared.

In one embodiment, the No Operation action does not perform any operation on the identified lock 715, but provides a return parameter (i.e., Return.result of "1") to the initiating client upon execution. Moreover, after each of the Lock, Unlock, Unlock Increment, Reset Lock, Activity On, Activity Off, and No Operation actions, return parameters in addition to those described above are provided to the initiating client 105. These additional return parameters include: Return.state, corresponding to the value of the state element 805 of the identified lock 715 (i.e., Lock[ID].state), Return.activity, corresponding to the value of the activity element 800 of the identified lock 715 (i.e., Lock[ID].activity), and Return.version, corresponding to the value of the version counter 810 element of the identified lock 715 (i.e., Lock[ID].version).

According to one aspect of the invention, the initiating client 105 is capable of saving these return parameter values, such as for maintaining data coherence between data stored on the storage device 115 and copies of that data stored in a memory cache at the initiating client 105. According to another aspect of the invention, these return parameter values are saved for subsequently providing an input version counter value during activity monitoring. Activity monitoring is particularly useful for prioritizing access to storage capacity or for providing failure recovery, such as when a client 105 has acquired a particular lock 715, but its associated version counter 810 has not been updated for an extended period of time.

According to one aspect of the invention, the version counter 810 values will periodically "roll-over" from a maximum value to zero because of a finite number of bits of version counter 810. In one example, offered for illustration, if the number of bits of version counter 810 is between 7 and 16, it is possible for an often-accessed lock 715 to roll-over more than once per second. In another example, also offered for illustration, if the DLock command requires 1 millisecond to execute a Lock action and 1 ms to execute an Unlock action, then at least 2 milliseconds is needed to increment the value of version counter 810. In this case, if version counter 810 includes 22 bits, then $2^{22}$ such 2 millisecond intervals, or 2.33 hours, is the known minimum time between rollover occurrences of version counter 810. On the other hand, if version counter 810 includes 32 bits, then $2^{32}$ such 2 millisecond intervals, or 12 days, is the known minimum time between rollover occurrences of version counter 810. According to one aspect of the invention, such long durations between rollover occurrences ensures that rollover occurrences are not difficult to detect.

In one embodiment, clients 105 do not assume that the version counter 810 value is slowly growing and that roll-over has not occurred. Instead, clients 105 determine whether roll-over has occurred by timing the access of each lock 715. If, upon accessing an identified lock 715, its version counter 810 value differs from its previous value during a prior access by an amount that is less than a difference in version counter 810 values that is known to correspond to a minimum roll-over time, then it is known that roll-over did not occur during the interim time period between accesses.

According to another aspect of the invention, these return parameter values are saved for measuring activity of particular ones of the locks 715 for load balancing, such as between different shared storage devices 115. For example, if the locks 715 of a particular shared storage device 115 are more active than the locks 715 of a different shared storage device 115, the stored data can be redistributed across the storage devices 115 to balance or optimize use of the shared storage devices 115. Similarly, load balancing can be carried out on a single shared storage device by redistributing data across storage blocks 605, or redistributing storage blocks 605 across the locks 715. This is useful when some locks 715 are accessed more often than other locks 715. According to one aspect of the invention, remapping of the locks 715 to the storage blocks 605 is performed by the GFS file system, such as for load balancing based on the activity of particular locks 715 with respect to activity of other locks 715.

Example 1: Device Lock Operation

According to one aspect of the invention, the GFS distributed file system uses the locks 715 to maintain consistency between data stored in the storage devices 115 and copies of the data cached in the main memories of the clients 105. For example, particular ones of locks 715 are assigned to storage blocks 605 that store file system resources such as metadata. In another example, locks 715 are assigned to storage blocks 605 storing entire data files. Before a client 105 is allowed to access the data stored in one or more storage blocks 605 assigned to a particular lock 715, the client 105 identifies and acquires that lock 715 using the Lock action, as described above. When the client 105 is finished accessing this data, the client 105 releases the identified lock 715. In releasing the identified lock 715, the Unlock action is typically used if the client has not written back modified data to the storage device 115. Otherwise, the Unlock Increment action is used in releasing the identified lock 715, such that its associated version counter 810 is updated, thereby signifying to other clients 105 that the data was modified.

According to another aspect of the invention, after releasing the identified lock 715, the client 105 caches the data, such as in its system memory. In this case, it may not be known whether the data cached at the client 105 is consistent with the data residing on the storage device 115. Even if the client 105 has not modified its cached data, other clients 105 may have subsequently modified the data residing on the storage device 115 after the client 105 released the identified lock 715. One way in which the client 105 determines the consistency of its cached data with that on the storage device 115 is upon again acquiring the identified lock 715 using the Lock action.

If, upon reacquisition of the identified lock 715, its version counter 810 value is the same as during the previous acquisition of the identified lock 715 by the same client 105, then the data stored in the corresponding one or more storage blocks 605 has not been modified during the intervening time period. If the version counter 810 value of the identified lock 715 upon reacquisition is different than the version counter 810 value during the previous acquisition of the identified lock 715 by the same client 105, then the data stored in the corresponding one or more storage blocks 605 may have been modified during the intervening time period. According to one aspect of the invention, the client 105 rereads the data from the storage device 115 if the version counter 810 value, upon reacquisition of the identified lock 715, differs from the version counter 810 value saved by the client 105 during its previous acquisition of the identified lock 715.

FIG. 9 is a table illustrating generally, by way of example, but not by way of limitation, one possible sequence of events undertaken by a first client 105A and a second client 105B in accessing shared data. The shared data is stored in one or more storage blocks 605 corresponding to a particular identified lock 715 residing on a particular storage device 115. Actions by each of first client 105A and second client 105B are listed. Such actions initiate operations at the storage device 115 executed in response to DLock commands. These actions are communicated by the first client 105A and second client 105B to the storage device 115 for execution by its controller 705. Other listed actions indicate whether the shared data was modified. Also listed are return parameters that are communicated back to the initiating one of the first client 105A and second client 105B upon execution of any of the Dlock actions. First client 105A and second client 105B are capable of storing these return parameters in local memory. These return parameters include Return.state and Return.version, corresponding to the values of the state element 805 and version counter 810, respectively, of the identified lock 715. FIG. 9 also indicates whether the data cached locally at each of the first client 105A and second client 105B is consistent with the data stored at the storage device 115 in the one or more storage blocks 605 controlled by the identified lock 715. FIG. 9 also indicates the value of the state element 805 and version counter element 810 of the identified lock 715. In this example described below, the activity element 800 of the identified lock 715 is set to "0" hex (i.e., activity monitoring is turned off).

Time 900 sets forth an initial state in which the state element 805 is "0" hex, indicating that the lock 715 is available for acquisition by any client 105. The version counter 810 is also "0." Each of first client 105A and second client 105B assumes the version counter 810 to have rolled over, as described above, and as indicated by the Return.state of "X."

At time 901, first client 105A acquires the lock 715, setting its state element 805 to "1," and returning the present value of each of the state element 805 (i.e., Return.state="1" hex) and the version counter 810 (i.e., Return.version="0" hex) to the first client 105A. Since Return.version at time 901 is different than its previous value at time 900, the data at first client 105A is deemed not consistent with the data at storage device 115. According to one aspect of the invention, first client 105A optionally rereads from storage device 115 and updates its local copy of the data to be consistent with the data at storage device 115. At time 902, first client 105A does not modify the shared data stored in the one or more storage blocks 605 corresponding to the identified lock 715. Since the shared data was not modified, first client 105A releases the identified lock 715 at time 903 using the Unlock action, which does not increment version counter 810, but which resets the state element 805 to "0" hex. Execution of the Unlock action at time 903 also returns the updated present value of each of the state element 805 (i.e., Return.state="0" hex) and the version counter 810 (i.e., Return.version="0" hex) to the first client 105A. The released identified lock 715 is available for acquisition by other clients 105.

At time 904, second client 105B acquires the lock 715, setting its state element 805 to "1" hex, and returning the present value of each of the state element 805 (i.e., Return.state="1" hex) and the version counter 810 (i.e., Return.version="0" hex) to the second client 105B. Since, at time 904, Return.version of second client 105B is different than its previous value at time 903, the data at second client 105B is deemed not consistent with the data at storage device 115. According to one aspect of the invention, second client 105B optionally rereads from storage device 115 and updates its local copy of the data to be consistent with the data at storage device 115. At time 905, second client 105B does not modify the shared data stored in the one or more storage blocks 605 controlled by the identified lock 715. Since the shared data was not modified, second client 105B releases the identified lock 715 at time 906 using the Unlock action, which does not increment version counter 810, but which resets the state element 805 to "0" hex. Execution of the Unlock action at time 906 also returns the updated present value of each of the state element 805 (i.e., Return.state="0" hex) and the version counter 810 (i.e., Return.version="0" hex) to the second client 105B. The released identified lock 715 is available for acquisition by other clients 105.

At time 907, second client 105B again acquires the lock 715, setting its state element 805 to "1," and returning the present value of each of the state element 805 (i.e., Return.state="1" hex) and the version counter 810 (i.e., Return.version="0" hex) to the second client 105B. Since Return.version at time 907 is the same as its previous value at time 906, the data at second client 105B is deemed consistent with the data at storage device 115. According to one aspect of the invention, second client 105B does not update its local copy of the data since it is already consistent with the data at storage device 115. At time 908, second client 105B modifies the shared data stored in the one or more storage blocks 605 corresponding to the identified lock 715. Since the shared data was modified, second client 105B releases the identified lock 715 at time 909 using the Unlock Increment action, which increments version counter 810 and resets the state element 805 to "0" hex. Execution of the Unlock Increment action at time 906 also returns the updated present value of each of the state element 805 (i.e., Return.state="0" hex) and the version counter 810 (i.e., Return.version="1" hex) to the second client 105B. The released identified lock 715 is available for acquisition by other clients 105.

At time 910, first client 105A acquires the lock 715, setting its state element 805 to "1" hex, and returning the present value of each of the state element 805 (i.e., Return.state="1" hex) and the version counter 810 (i.e., Return.version="1" hex) to the first client 105A. Since Return.version at time 910 is different than its previous value at time 909, the data at first client 105A is deemed not consistent with the data at storage device 115. According to one aspect of the invention, first client 105A optionally rereads from storage device 115 and updates its local copy of the data to be consistent with the data at storage device 115. At time 911, first client 105A modifies the shared data stored in the one or more storage blocks 605 controlled by the identified lock 715. Since the shared data was modified, first client 105A releases the identified lock 715 at time 912 using the Unlock Increment action, which increments version counter 810 and resets the state element 805 to "0" hex. Execution of the Unlock Increment action at time 912 also returns the updated present value of each of the state element 805 (i.e., Return.state="0" hex) and the version counter 810 (i.e., Return.version="2" hex) to the first client 105A. The released identified lock 715 is available for acquisition by other clients 105.

At time 913, second client 105B acquires the lock 715, setting its state element 805 to "1" hex and returning the present value of each of the state element 805 (i.e., Return.state="1" hex) and the version counter 810 (i.e., Return.version="2" hex) to the second client 105B. Since Return.version at time 913 is different than its previous value at time 912, the data at second client 105B is deemed not consistent with the data at storage device 115. According to one aspect of the invention, second client 105B optionally rereads from storage device 115 and updates its local copy of the data to be consistent with the data at storage device 115. At time 914, second client 105B does not modify the shared data stored in the one or more storage blocks 605 corresponding to the identified lock 715. Since the shared data was not modified, second client 105B releases the identified lock 715 at time 915 using the Unlock action, which does not increment version counter 810, but which resets the state element 805 to "0" hex. Execution of the Unlock action at time 915 also returns the updated present value of each of the state element 805 (i.e., Return.state="0" hex) and the version counter 810 (i.e., Return.version="2" hex) to the second client 105B. The released identified lock 715 is available for acquisition by other clients 105.

At time 916, first client 105A acquires the lock 715, setting its state element 805 to "1" hex, and returning the present value of each of the state element 805 (i.e., Return.state="1" hex) and the version counter 810 (i.e., Return.version="2" hex) to the first client 105A. Since Return.version at time 916 is the same as its previous value at time 915, the data at first client 105A is deemed consistent with the data at storage device 115. According to one aspect of the invention, first client 105A does not update its local copy of the data since it is already consistent with the data at storage device 115. At time 917, first client 105A does not modify the shared data stored in the one or more storage blocks 605 controlled the identified lock 715. Since the shared data was not modified, first client 105A releases the identified lock 715 at time 918 using the Unlock action, which does not increment version counter 810, but which resets the state element 805 to "0" hex. Execution of the Unlock action at time 918 also returns the updated present value of each of the state element 805 (i.e., Return.state="0" hex) and the version counter 810 (i.e., Return.version="2" hex) to the first client 105A. The released identified lock 715 is available for acquisition by other clients 105.

Example 1: Failure Recovery Using Device Locks

As set forth above, device locks 715 are distributed across various storage devices 115 instead of at a centralized server. As a result, the present invention avoids problems associated with failures of a centralized server. Failure of particular storage devices 115 or clients 105, however, is still possible.

Failure or power-on of the storage device 115 will clear the activity element 800, state element 805, and version counter element 810 of each lock 715 in the volatile controller memory 710 on the failing storage device 115. By contrast, a SCSI Reset command received by the storage device 115 will not affect the activity element 800, state element 805, and version counter element 810 of the locks 715 on that storage device 115. After failure or power-on of storage device 115, the storage device 115 sends a SCSI Unit Attention status to notify clients 105 or other nodes that the locks 715 have been cleared. When a client 105 or other node receives a SCSI Unit Attention status, the client 105 checks previously acquired locks 715 on storage devices 115 to see if they are still valid (i.e., that state element 805 is still set and the version counter 810 state is unchanged). The client 105 will re-acquire any locks 715 that may have been lost, such as by failure or power-on of the storage device 115.

Similarly, a client 105 or other node may fail, be taken off-line, or have its power cycled. A client 105 that has already acquired a lock 715, but then fails, could potentially leave the lock 715 in a locked state indefinitely. In order to avoid this problem, the present invention allows other clients 105 to forcibly release such locks 715, such as by using the Reset Lock action described above.

A client 105, attempting to acquire a particular lock 715 that has already been acquired by a failed client 105, can determine the status of the particular lock 715 by turning activity monitoring on using the Activity On action, described above. With activity monitoring turned on, the version counter 810 is updated for both Unlock and Unlock Increment actions. If, after waiting for a predetermined extended period of time, the version counter 810 value is unchanged (i.e., shows no activity), then the client 105 deems the corresponding lock 715 as being owned by a failed client 105. In this case, the client 105 turns off activity monitoring using the Activity Off action, described above. The client 105 also forcibly releases the lock 715 using the Reset Lock action, described above. A client 105 should exercise care (e.g., by selecting an appropriately long predetermined activity monitoring time period) when forcibly releasing a lock 715 owned by another client 105. The other client 105 may have failed, or may be in a hung state from which it will eventually return, believing it still owns the lock 715.

According to one aspect of the invention, the forcible release of a lock 715 using the Reset Lock action compares the present value of version counter 810 with an input version counter value provided by the client 105 that is forcibly releasing the lock 715. The lock 715 will be cleared only if the client 105 can identify the present value of the version counter 810. This resolves a situation in which two clients 105 are each trying to forcibly release the same lock 715. One of these clients 105 will manage to forcibly release the lock 715 first, thereby updating its version counter 810. This will prevent the other client 105 from also releasing the lock. Since the version counter 810 value has changed, it will no longer match the input version counter value provided by the subsequent client 105. Thus, the subsequent client's Reset Lock action is ignored by the storage device 115.

Example 1: Device Lock Command

According to one aspect of the invention, clients 105 access particular locks 715 on the storage devices 115 using a new Device Lock (DLock) command that is added to the standard SCSI command set. The SCSI DLock command has several input parameters that indicate to the storage device 115 what action to perform, including actions performed on the activity element 800, state element 805, and version counter element 810 of the locks 715. The DLock command includes a sequence of several bytes defining these input parameters. In one embodiment, the first byte of the DLock command identifies it as the DLock command, distinguishing this new SCSI command from existing SCSI commands. Table 4 lists an example of hexadecimal codes used to identify the SCSI DLock and Mode Page commands. Table 5 lists one embodiment, by way of example, but not by way of limitation, of a sequence of bytes comprising a DLock command.

TABLE 4

Codes Defining SCSI Commands

| Function | Hexadecimal Code Value |
|---|---|
| DLock | A0 |
| Mode Page | 29 |

TABLE 5

DLock Command of Example 1

| Byte | Bit 7 | Bit 6 | Bit 5 | Bit 4 | Bit 3 | Bit 2 | Bit 1 | Bit 0 |
|---|---|---|---|---|---|---|---|---|
| 0 | DLock Command = A0 (hexadecimal value) | | | | | | | |
| 1 | Reserved | | | | | | Action (See Table 6) | |
| 2 | Lock Identification (ID) | | | | | | | |
| 3 | (4 bytes) | | | | | | | |
| 4 | | | | | | | | |
| 5 | | | | | | | | |
| 6 | Input Version Value | | | | | | | |
| 7 | (4 bytes) | | | | | | | |
| 8 | | | | | | | | |
| 9 | | | | | | | | |
| 10 | Allocation Length | | | | | | | |
| 11 | Control Byte | | | | | | | |

In Table 5, a hexadecimal (hex) value A0 in the first byte in the DLock Command (Byte 0) identifies it as the DLock command. Table 6 lists one embodiment, by way of example, but not by way of limitation, of hexadecimal codes used in the lower nibble of Byte 1 to specify which of the DLock actions of Table 3 should be executed by the storage device 115. These actions include Lock, Unlock, Unlock Increment, Reset Lock, Activity On, Activity Off, and No Operation. In Table 5, Bytes 2–5 specify the Lock Identification (ID) number of the particular lock 715 on which the DLock action operates. In Table 5, Bytes 6–9 specify an input version counter value parameter, such as needed for the Reset Lock action described above. Byte 10 of the DLock command specifies an allocation length (e.g., the maximum number of data bytes to be returned to the initiating client 105).

TABLE 6

Action Codes for defining a particular DLock command of Example 1

| Action | Hexadecimal Code Value |
|---|---|
| No Operation | 0 |
| Lock | 1 |
| Unlock | 2 |
| Unlock Increment | 3 |
| Reset Lock | 4 |
| Activity On | 5 |
| Activity Off | 6 |
| Reserved | 7 through F |

The SCSI command set allows the storage device 115 to return SCSI-defined Sense Data information. The Sense Data information is returned either in response to the SCSI Request Sense command, or upon occurrence of certain conditions resulting from execution of other SCSI commands, such as the DLock command. If the DLock command contains an error, e.g., an illegal action in the lower nibble of Byte 1, or Bytes 2–5 identify an unsupported lock 715, the storage device 115 provides Sense Data information indicating the nature of the problem with the DLock command.

Table 7 illustrates generally, by way of example, but not by way of limitation, one embodiment of returned data provided to client 105 by storage device 115 upon execution of one of the actions listed in Table 6 and described more particularly in Table 3. In the first byte (Byte 0) of the returned data, Bit 7 carries the Return.Result return parameter, which is set if execution of the action was successful. Bit 6 of Byte 0 carries the Return.State return parameter, which indicates whether the lock 715 is in an acquired state after execution of the action. Bit 5 of Byte 0 carries the Return.Activity return parameter, which is set if activity monitoring is turned on after execution of the action. Bytes 1–4 carry the Return.version return parameter, which indicates the value of the version counter 810 after execution of the action.

TABLE 7

Returned Data

| Byte | Bit 7 | Bit 6 | Bit 5 | Bit 4 | Bit 3 | Bit 2 | Bit 1 | Bit 0 |
|---|---|---|---|---|---|---|---|---|
| 0 | Result | State | Activity | | | Reserved | | |
| 1 | | | | Returned Version Value | | | | |
| 2 | | | | (4 bytes) | | | | |
| 3 | | | | | | | | |
| 4 | | | | | | | | |
| 5 | | | | Reserved | | | | |
| 6 | | | | Reserved | | | | |
| 7 | | | | Reserved | | | | |

The SCSI Mode Sense and Mode Select commands allow access to and modification of a SCSI-defined Device Locks mode page on the storage device 115. Table 8 illustrates one embodiment, by way of example, but not by way of limitation, of a sequence of bytes comprising a Device Locks mode page. According to one aspect of the invention, the Mode Sense and Mode Select commands are used for configuring the device locks 715 on a storage device 115. Controller memory 710 of each storage device 115 typically includes several SCSI-defined "pages" of configuration data. One such page is a Device Locks mode page accessed and updated by the Mode Sense and Mode select commands. The Device Locks mode page allows storage of configuration data unique to a particular type of storage device 115.

According to one aspect of the invention, the Device Locks mode page is also used for configuring the device locks 715 on a storage device 115. The Device Locks mode page is identified by a hexadecimal code value of 29 in Byte 0 of the Device Locks mode page, as illustrated in Table 8. Bit 7 of Byte 0 also includes a Parameter Savable (PS) bit. The PS bit is set to indicate this page may be saved on storage device 115. A Mode Sense command is used to read the current Device Locks mode page on storage device 115. A Mode Select command is used to write the Device Locks mode page to storage device 115.

TABLE 8

SCSI Device Locks mode page (Hexadecimal values).

| Byte | Bit 7 | Bit 6 | Bit 5 | Bit 4 | Bit 3 | Bit 2 | Bit 1 | Bit 0 |
|---|---|---|---|---|---|---|---|---|
| 0 | PS | | | Vendor Unique Page Code=29 | | | | |
| 1 | | | | Page Length =06 | | | | |
| 2 | | | | Lock Size (Encoded) | | | | |
| 3 | | | | Supported Lock Sizes (Encoded) | | | | |
| 4 | | | | Number of Supported Locks | | | | |
| 5 | | | | (4 bytes) | | | | |
| 6 | | | | | | | | |
| 7 | | | | | | | | |

In Table 8, Byte 1 defines the length of the configuration data in the Device Locks mode page. Byte 2 represents an encoded value that defines the presently selected Lock Size (i.e., defining the number of bits in its version counter 810 of each lock 715 on the storage device 115). One example encoding of the Lock Size is illustrated in Table 9, in which a hexadecimal value of 01 represents a 22 bit version counter 810, while a hexadecimal value of 02 represents a 30 bit version counter 810. In Table 8, Byte 3 represents an encoded value that defines other Supported Lock Sizes available on the storage device 115. One example of encoding the Supported Lock Sizes is illustrated in Table 10, in which Bit 0 is set for a 24 bit version counter 810, and Bit 1 is set for a 32 bit version counter 810, and "x" represents a "don't care" for the corresponding bit position. In Table 8, bytes 4–7 describe the number of locks 715 supported by the target storage device 115. The number of supported locks 715 depends on the Lock Size and the storage capacity available in the controller memory 710 of the target storage device 115.

TABLE 9

Example of Encoding Lock Size in Device Locks mode page

| Binary Encoding | State Element 805 Size | Activity Element 800 Size | Version Counter Element 810 Size | Total Size of Lock 715 |
|---|---|---|---|---|
| 00000001 | 1 bit | 1 bit | 22 bits | 24 bits |
| 00000010 | 1 bit | 1 bit | 30 bits | 32 bits |

TABLE 10

Example of Encoding Supported Lock Size in Device Locks mode page

| Binary Encoding | State Element 805 Size | Activity Element 800 Size | Version Counter Element 810 Size | Total Size of Lock 715 |
|---|---|---|---|---|
| xxxxxxx1 | 1 bit | 1 bit | 22 bits | 24 bits |
| xxxxxx1x | 1 bit | 1 bit | 30 bits | 32 bits |

Treatment of power cycles, resets, SCSI Mode Select commands, and other conditions is described below. In response to a SCSI Mode Select command identifying the Device Locks mode page, the storage device 115 issues a SCSI Unit Attention. The storage device 115 also clears the state element 805 and zeros the version counter 810 of each of its locks 715. In response to a power cycle or power-on of the storage device 115, the storage device 115 issues a SCSI Unit Attention indicating a power-on condition. The storage device 115 also zeros the version counter 810 of each of its locks 715. In response to a SCSI Reset, the storage device 115 issues a SCSI Unit Attention indicating a power-on condition. The values of the activity element 800, state element 805, and version counter 810 of each of the locks 715 on the storage device 115 are not affected. In response to a SCSI Bus Device Reset, Task Management, or Target Reset commands, the values of the activity element 800, state element 805, and version counter 810 of each of the locks 715 on the storage device 115 are not affected.

Example 1: Test System

The GFS file system was tested using a system 100 having two clients 105 and two shared storage devices 115. One of the clients 105 included a POWER ONYX computer, sold by Silicon Graphics, Inc. (SGI), of Mountain View, Calif., having four 194 Megahertz MIPS R10000 processors. The other client 105 included a POWER CHALLENGE computer, also sold by SGI, having eighteen 75 Megahertz MIPS R8000 processors. Each of the clients 105 included 2 Gigabytes of 8-Way interleaved memory and a HIO-FC dual-ported host adapter, sold by Prisa Networks of San Diego, Calif. The storage devices 115 included two RF 7000 series disk arrays, sold by Ciprico, Inc. of Plymouth, Minn. Each storage device 115 disk array used a RAID-3 configuration with nine (8 data+1 parity) BARRACUDA 9 (ST19171 WC) disks, sold by Seagate Technology, Inc. of Scotts Valley, Calif.

Two different fibre channel interface 200 configurations were used to implement the network 110 connection. The clients 105 and storage devices 115 were first connected using a single arbitrated loop fibre channel interface 200 having a maximum transfer rate of 100 Megabytes/second. The second configuration provided two arbitrated loop fibre channel interfaces 200. Each storage device 115 was coupled to its own fibre-channel interface 200. Each client 105 was coupled to both fibre-channel interfaces 200. This scheme allows the clients 105 access to each storage device 115 with a total network bandwidth of 200 Megabytes/second. In one test, the single arbitrated loop configuration obtained data transfer rates of approximately 60 Megabytes/second, and the configuration using two arbitrated loops obtained data transfer rates of approximately 108 Megabytes/second. These data rates compare favorably with more costly conventional systems.

Example 2: Lock Structure

FIG. 8B illustrates generally, by way of example, but not by way of limitation, another embodiment of portions of the present system including device locks described in this Example 2. The device locks of Example 2 have lock structure similar to that described above with respect to Example 1. In Example 2, however, each lock includes a state element 805 (Lock[ID].state) that can be: Unlocked (also referred to as "U," i.e., having a value of "0" hex), Locked Shared (also referred to as "S," i.e., having a value of "1" hex), or Locked Exclusive (also referred to as "E," i.e., having a value of "2" hex).

Moreover, in Example 2, each lock 715 includes an associated expiration timer 820 and an expiration status element (Lock[ID].expired) 825. The expiration status element 825 indicates whether the expiration timer 820 has expired and, if so, whether it has expired from an exclusive or shared locked acquisition.

Furthermore, in Example 2, each lock 715 includes a field indicating the number of current lock holders (Lock[ID].holders), and a World Wide Name (WWN) list 815 identifying all clients 105 sharing use of the lock 715. Also, the returned data of Table 7 includes a Return Data Expired field and a WWN Data field. These aspects of Example 2 are described below.

Example 2: Device Lock Actions

The device lock actions of Example 2 include Lock Exclusive, Lock Shared, Force Lock Exclusive, Touch Lock, and Report Expired actions, one embodiment of which is described below, by way of example, but not by way of limitation, in Table 11.

In one embodiment, the Lock Shared action checks the state element 805 of the particular lock 715 identified by the lock ID. If the state element 805 is set to "E," the identified lock 715 has been exclusively acquired by one of the clients 105. If, upon checking the WWN list 815 for the identified lock 715, it is held exclusively by a client 105 that is different from the initiating client 105, then a return parameter (i.e., Return.Result of "0" hex) informs the initiating client 105 that the identified lock 715 has already been acquired exclusively by another client 105. 10 Otherwise, if checking the WWN list 815 reveals that the identified lock 715 is held exclusively by the initiating client 105, state element 805 is set to "S," and the expiration timer 820 associated with the identified lock 715 is reset.

Upon execution of the Lock Shared action, if the state element 805 is "S" and if the number of clients 105 sharing use of the lock 715 is less than a maximum allowable number (MaxHolders), then the initiating client 105 acquires identified lock 715 for shared use by adding the WWN of client 105 to the WWN list 815 of the identified lock 715. The expiration timer 820 for the identified lock 715 is reset. If the number of clients 105 sharing use of the lock 715 equals the maximum allowable number (MaxHolders), then a return parameter (i.e., Return.Result of "0" hex) informs the initiating client 105 that the identified lock 715 is already shared by the maximum allowable number of clients 105.

Upon execution of the Lock Shared action, if the state element 805 is "U," then the number of lock holders is set to 1, the WWN of the initiating client 105 is added to the WWN list 815 of the identified lock 715, the expiration timer 820 of the identified lock 715 is reset, and a return parameter (i.e., Return.Result of "1" hex) is returned to the initiating client 105. If the expiration timer 820 of the identified lock 715 has expired from an exclusive acquisition, then state element 805 of the identified lock 715 is set to "E," otherwise the state element 805 of the identified lock is set to "S."

In one embodiment, the Lock Exclusive action checks the state element 805 of the particular lock 715 identified by the lock ID. If the state element 805 is set to "E," the identified lock 715 has been exclusively acquired by one of the clients 105. Other clients 105 are excluded from accessing the one or more storage blocks 605 corresponding to the identified lock 715 if the state element 805 is set to "E." A return parameter (i.e., Return.Result of "0" hex) informs the initiating client 105 that the identified lock 715 has already been acquired exclusively by another client 105.

Upon execution of the Lock Exclusive action, if the state element 805 is "S," and the identified lock 715 indicates only one current lock holder which, from the WWN list 815 of the identified lock 715, is identified as the initiating client 105, then the state element 805 of the identified lock 715 is set to "E," the expiration timer of the identified lock 715 is reset, and a return parameter (i.e., Return.result="1" hex) informs the initiating client 105 that the identified lock 715 has been acquired exclusively. Otherwise a return parameter (i.e., Return.result="0" hex) informs the initiating client 105 that the identified lock 715 could not be exclusively acquired.

Upon execution of the Lock Exclusive action, if the state element 805 is "U," then the state element 805 of the identified lock 715 is set to "E," the number of lock holders of the identified lock 715 is set to 1, the WWN of the initating client 105 is added to the WWN list 815 of the identified lock 715, the expiration timer 820 of the identified lock 715 is reset, and a return parameter (i.e., Return.result="1" hex) informs the initiating client 105 that the identified lock 715 was exclusively acquired.

In one embodiment, the Force Lock Exclusive action includes, as an input parameter, a previously-read value of the version counter 810 of a particular lock 715. In one example, the Force Lock Exclusive action is executed after waiting for a predetermined period of time following the earlier reading of the version counter 810 of the lock 715. If the state element 805 of the identified lock 715 is set to "S"

TABLE 11

Example 2 of One Embodiment of DLock Actions

| Action | Description of Action |
|---|---|
| Lock Shared | if (Lock[ID].state = U = 0 hex) then<br>  If Lock[ID].expired = ExpiredFromLock<br>    Exclusive<br>  then<br>    Lock[ID].state ← (E = 2 hex)<br>  else<br>    Lock[ID].state ← (S = 1 hex);<br>  Return.result ← 1<br>  Lock[ID].holders ← 1<br>  Add WWN to list<br>  Reset expiration timer;<br>if (Lock[ID].state = S = 1 hex) then<br>  if (Lock[ID].holders < MaxHolders) then<br>    Return.result ← 1<br>    Increment Lock[ID].holders<br>    Add WWN to list<br>    Reset Expiration Timer;<br>  else<br>    Return.result ← 0;<br>if (Lock[ID].state = E = 2 hex) then<br>  if Lock[ID].wwn[0] = wwn then<br>    Return.result ← 1<br>    Lock[ID].state ← S = 1 hex<br>    Reset expiration timer<br>  else<br>    Return.result ← 0; |
| Lock Exclusive | if (Lock[ID].state = U = 0 hex) then<br>  Lock[ID].state ← (E = 2 hex)<br>  Return.result ← 1<br>  Lock[ID].holders ← 1<br>  Add WWN to list<br>  Reset expiration timer;<br>if (Lock[ID].state = S = 1 hex) then<br>  if (Lock[ID].holders = 1 and Lock[ID].wwn[0]<br>    =wwn) then<br>    Return.result ← 1<br>    Lock[ID].state ← (E = 2 hex)<br>    Reset Expiration Timer;<br>  else<br>    Return.result ← 0;<br>if (Lock[ID].state = E = 2 hex) then<br>  Return.result ← 0 |
| Force Lock Exclusive | if (Lock[ID].state = U = 0 hex) then<br>  Return.result ← 1<br>  Lock[ID].state ← (E = 2 hex)<br>  Lock[ID].holders ← 1<br>  Add WWN to list<br>  Reset expiration timer<br>if (Lock[ID].state = S or E = 1 hex or 2 hex) then<br>  if Lock[ID].version = (input version value) then<br>    Return.result ← 1<br>    Lock[ID].state ← (E = 2 hex)<br>    Lock[ID].holders ← 1<br>    Increment Lock[ID].version<br>    Clear WWN list<br>    Add WWN to list<br>    Reset expiration timer;<br>  else<br>    Return.result ← 0 |
| Touch Lock | if (Lock[ID].state = U = 0 hex) then<br>  Return.result ← 0<br>if (Lock[ID].state = S or E = 1 hex or 2 hex) then<br>  if WWN is in list then<br>    Return.result ← 1<br>    if Lock[ID] = FFFFFFFF hex then<br>      Reset expiration timer for all locks held<br>        by this initiating client<br>    else<br>      Reset expiration timer<br>  else<br>    Return.result ← 0 |
| Unlock Increment | if (Lock[ID].state = U = 0 hex) then<br>  Return.result ← 0<br>if (Lock[ID].state = S or E = 1 hex or 2 hex) then<br>  if WWN is on list<br>    Return.result ← 1<br>    Decrement Lock[ID].holders<br>    Remove WWN from list<br>    Increment Lock[ID].version<br>    if Lock[ID].holders = 0 then<br>      Lock[ID].state = U = 0 hex<br>  else<br>    Return.result ← 0 |
| Unlock | if (Lock[ID].state = U = 0 hex) then<br>  Return.result ← 0<br>if (Lock[ID].state = S or E = 1 hex or 2 hex) then<br>  if WWN is on list<br>    Return.result ← 1<br>    Decrement Lock[ID].holders<br>    Remove WWN from list<br>    if Lock[ID].activity = 1 then<br>      Increment Lock[ID].version<br>    if Lock[ID].holders = 0 then<br>      Lock[ID].state = U = 0 hex<br>  else<br>    Return.result ← 0 |
| Activity On | Lock[ID].activity ← 1<br>Return.result ← 1 |
| Activity Off | Lock[ID].activity ← 0<br>Increment Lock[ID].version<br>Return.result ← 1 |
| No Operation | Return.result ← 1 |
| Included with each of Lock Shared, Lock Exclusive, Force Lock Exclusive, Touch Lock, Unlock, Unlock Increment, Activity On, Activity Off, and No Operation actions | After Each Action<br>Return.state ← Lock[ID].state<br>Return.activity ← Lock[ID].activity<br>Return.version ← Lock[ID].version<br>Return.expired ← Lock[ID].expired<br>Return.wwn ← Lock[ID].wwn |
| Report Expired | Return Lock[ID].expired for all locks | or "E," then the previously-read value of version counter 810 is compared to the current value of version counter 810. If these values are identical, then the state element 805 of the identified lock 715 is set to "E," the number of holders of the identified lock 715 is set to 1, the WWN of the initiating client 105 is added to the WWN list 815 of the identified lock 715, the expiration timer 820 of the identified lock 715 is reset, and a return parameter (i.e., Return.result="1" hex) informs the initiating client that the identified lock 715 has forcibly been exclusively acquired. In one embodiment, the expiration status element (i.e., Lock[ID].expired) 825 associated with the identified lock 715 is updated to reflect the manner in which the lock 715 was held (e.g., "S" or "E") before the Force Lock Exclusive action was executed. If the comparison of the input value of version counter 810 to the current value of the version counter 810 is not identical, then a return parameter (i.e., Return.result="0" hex) informs the initiating client 105 that the identified lock 715 was not forcibly exclusively acquired.

If, upon executing the Force Lock Exclusive action, the state element 805 of the identified lock 715 is set to "U," then the state element 805 is set to "E," the number of lock holders of the identified lock 715 is set to 1, the WWN of the initiating client 105 is added to the WWN list 815 of the identified lock 715, the expiration timer 820 of the identified lock 715 is reset, and a return parameter (i.e., Return.result "1" hex) informs the initiating client 105 that the identified lock 715 was forcibly acquired exclusively. The expiration status element (i.e., Lock[ID].expired) 825 associated with the identified lock 715 is updated to reflect the manner in which the lock 715 was held (e.g., "U") before the Force Lock Exclusive action was executed.

In one embodiment, the Touch Lock action checks the state element 805 of the identified lock 715. If the state element 805 of the identified lock 715 is set to "E" or "S," and the WWN of the initiating client 105 is on the WWN list 815 of the identified lock 715, then the expiration timer 820 of the identified lock 715 is reset. However, if the lock ID input parameter to the Touch Lock action is set to an "all locks held" value (e.g., lock ID=FFFFFFFF hex), then all locks 715 that are held by the initiating client 105 are reset. In either case, a return parameter (i.e., Return.result="1" hex) is returned if the expiration timer(s) 820 were reset successfully, otherwise a different return parameter (i.e., Return.Result of "0" hex) is returned. If, upon execution of the Touch Lock action, the state element 805 of the identified lock 715 is set to "U," then a return parameter (i.e., Return.result="0" hex) is returned to the initiating client 105.

In one embodiment, the Unlock action checks the state element 805 of the identified lock 715. If the state element 805 of the identified lock 715 is set to "E" or "S," and the WWN of the initiating client 105 is on the WWN list 815 of the identified lock 715, then the number of lock holders of the identified lock 715 is decremented by 1, the WWN of the initiating client 105 is removed from the WWN list 815 of the identified lock 715, the version counter 810 of the identified lock 715 is incremented by 1 if the activity element is on, the state element 805 is set to "U" if the number of lock holders is zero after decrementing, and a return parameter (i.e., Return.result="1" hex) informs the initiating client 105 that the identified lock 715 was released. If the state element 805 of the identified lock 715 is set to "E" or "S," and the WWN of the initiating client 105 is not on the WWN list 815 of the identified lock 715, then a return parameter (i.e., Return.result="0" hex) informs the initiating client 105 that the identified lock 105 was not released. If, upon execution of the Unlock action, the state element 805 of the identified lock 715 is set to "U," a return parameter (i.e., Return.result="0") informs the initiating client 105 that the identified lock 715 was not released.

In one embodiment, the Unlock Increment action checks the state element 805 of the identified lock 715. If the state element 805 of the identified lock 715 is set to "E" or "S," and the WWN of the initiating client 105 is on the WWN list 815 of the identified lock 715, then the number of lock holders of the identified lock 715 is decremented by 1, the WWN of the initiating client 105 is removed from the WWN list 815 of the identified lock 715, the state element 805 is set to "U" if the number of lock holders is zero after decrementing, and a return parameter (i.e., Return.result= "1" hex) informs the initiating client 105 that the identified lock 715 was released. If the state element 805 of the identified lock 715 is set to "E" or "S," and the WWN of the initiating client 105 is not on the WWN list 815 of the identified lock 715, then a return parameter (i.e., Return.result="0" hex) informs the initiating client 105 that the identified lock 715 was not released. If, upon execution of the Unlock Increment action, the state element 805 of the identified lock 715 is set to "U," a return parameter (i.e., Return.result="0") informs the initiating client 105 that the identified lock 715 was not released.

In one embodiment, the Report Expired action obtains the expiration status 825 of the expiration timers 820 associated with all locks 715. The Report Expired action provides timely detection of locks 715 having associated expiration timers 820 that have expired, thereby allowing the client 105 to initiate recovery.

Example 2: Device Lock Operation

The device locks of Example 2 operate similarly to the device locks described with respect to Example 1. In Example 2, however, the Lock Shared action allows multiple clients 105 to access information that is not being changed. The Lock Exclusive action is used by a client 105 when it needs to change the information in the storage block 605 associated with the particular lock 715.

FIG. 10 is a table illustrating generally, by way of example, but not by way of limitation, another possible sequence of events undertaken by a first client 105A and a second client 105B in accessing shared data. The shared data is stored in one or more storage blocks 605 corresponding to a particular identified lock 715 residing on a particular storage device 115. Actions by each of first client 105A and second client 105B are listed. Such actions initiate operations at the storage device 115 executed in response to DLock commands. These actions are communicated by the first client 105A and second client 105B to the storage device 115 for execution by its controller 705. Other listed actions indicate whether the shared data was modified. Also listed are return parameters that are communicated back to the initiating one of the first client 105A and second client 105B upon execution of any of the DLock actions. First client 105A and second client 105B are capable of storing these return parameters in local memory. These return parameters include Return.state and Return.version, corresponding to the values of the state element 805 and version counter 810, respectively, of the identified lock 715. FIG. 10 also indicates whether the data cached locally at each of the first client 105A and second client 105B is consistent with the data stored at the storage device 115 in the one or more storage blocks 605 controlled by the identified lock 715. FIG. 10 also indicates the value of the state element 805 (U=Unlocked="0" hex, S=Locked Shared="1" hex, and E=Locked Exclusive="2" hex) and version counter element 810 of the identified lock 715. In this example described below, the activity element 800 of the identified lock 715 is set to "0" hex (i.e., activity monitoring is turned off) and no lock expiration timers 820 expire.

Time 1000 sets forth an initial state in which the state element 805 is "U," indicating that the lock 715 is unlocked and available for acquisition by any client 105. The version counter 810 is also "0." Each of first client 105A and second client 105B assumes the version counter 810 to have rolled over, as described above, and as indicated by the Return.state of "X."

At time 1001, first client 105A acquires the lock 715 using a Lock Shared action, setting its state element 805 to "S," and returning the present value of each of the state element 805 (i.e., Return.state="S") and the version counter 810 (i.e., Return.version="0") to the first client 105A. Since Return.version at time 1001 is different than its previous value at time 1000, the data at first client 105A is deemed not consistent with the data at storage device 115. According to one aspect of the invention, first client 105A optionally rereads from storage device 115 and updates its local copy of the data to be consistent with the data at storage device 115. At time 1002, first client 105A does not modify the shared data stored in the one or more storage blocks 605 corresponding to the identified lock 715. Since the shared data was not modified, first client 105A releases the identified lock 715 at time 1003 using the Unlock action, which does not increment version counter 810, but which resets the state element 805 to "U." Execution of the Unlock action at time 1003 also returns the updated present value of each of the state element 805 (i.e., Return.state="U") and the version counter 810 (i.e., Return.version="0" hex) to the first client 105A. The released identified lock 715 is available for acquisition by other clients 105.

At time 1004, second client 105B acquires the lock 715 using the Lock Shared action, setting its state element 805 to "S," and returning the present value of each of the state element 805 (i.e., Return.state="S") and the version counter 810 (i.e., Return.version="0" hex) to the second client 105B. Since, at time 1004, Return.version of second client 105B is different than its previous value at time 1003, the data at second client 105B is deemed not consistent with the data at storage device 115. According to one aspect of the invention, second client 105B optionally rereads from storage device 115 and updates its local copy of the data to be consistent with the data at storage device 115. At time 1005, second client 105B does not modify the shared data stored in the one or more storage blocks 605 controlled by the identified lock 715. Since the shared data was not modified, second client 105B releases the identified lock 715 at time 1006 using the Unlock action, which does not increment version counter 810, but which resets the state element 805 to "U." Execution of the Unlock action at time 1006 also returns the updated present value of each of the state element 805 (i.e., Return.state="U") and the version counter 810 (i.e., Return.version="0" hex) to the second client 105B. The released identified lock 715 is available for acquisition by other clients 105.

At time 1007, second client 105B again acquires the lock 715 using the Lock Exclusive Action, setting its state element 805 to "E," and returning the present value of each of the state element 805 (i.e., Return.state="E") and the version counter 810 (i.e., Return.version="0" hex) to the second client 105B. Since Return.version at time 1007 is the same as its previous value at time 1006, the data at second client 105B is deemed consistent with the data at storage device 115. According to one aspect of the invention, second client 105B does not update its local copy of the data since it is already consistent with the data at storage device 115. At time 1008, second client 105B modifies the shared data stored in the one or more storage blocks 605 corresponding to the identified lock 715. Since the shared data was modified, second client 105B releases the identified lock 715 at time 1009 using the Unlock Increment action, which increments version counter 810 and resets the state element 805 to "U." Execution of the Unlock Increment action at time 1006 also returns the updated present value of each of the state element 805 (i.e., Return.state="U") and the version counter 810 (i.e., Return.version="1" hex) to the second client 105B. The released identified lock 715 is available for acquisition by other clients 105.

At time 1010, first client 105A acquires the lock 715 using the Lock Shared action, setting its state element 805 to "S," and returning the present value of each of the state element 805 (i.e., Return.state="S") and the version counter 810 (i.e., Return.version="1" hex) to the first client 105A. Since Return.version at time 1010 is different than its previous value at time 1009, the data at first client 105A is deemed not consistent with the data at storage device 115. According to one aspect of the invention, first client 105A optionally rereads from storage device 115 and updates its local copy of the data to be consistent with the data at storage device 115. At time 1011, first client 105A modifies the shared data stored in the one or more storage blocks 605 controlled by the identified lock 715. Since the shared data was modified, first client 105A releases the identified lock 715 at time 1012 using the Unlock Increment action, which increments version counter 810 and resets the state element 805 to "U." Execution of the Unlock Increment action at time 1012 also returns the updated present value of each of the state element 805 (i.e., Return.state="U") and the version counter 810 (i.e., Return.version="2" hex) to the first client 105A. The released identified lock 715 is available for acquisition by other clients 105.

At time 1013, second client 105B acquires the lock 715 using the Lock Shared action, setting its state element 805 to "S," and returning the present value of each of the state element 805 (i.e., Return.state="S") and the version counter 810 (i.e., Return.version="2" hex) to the second client 105B. Since Return.version at time 1013 is different than its previous value at time 1012, the data at second client 105B is deemed not consistent with the data at storage device 115. According to one aspect of the invention, second client 105B optionally rereads from storage device 115 and updates its local copy of the data to be consistent with the data at storage device 115. At time 1014, second client 105B does not modify the shared data stored in the one or more storage blocks 605 corresponding to the identified lock 715. Since the shared data was not modified, second client 105B releases the identified lock 715 at time 1015 using the Unlock action, which does not increment version counter 810, but which resets the state element 805 to "U." Execution of the Unlock action at time 1015 also returns the updated present value of each of the state element 805 (i.e., Return.state="U") and the version counter 810 (i.e., Return.version="2" hex) to the second client 105B. The released identified lock 715 is available for acquisition by other clients 105.

At time 1016, first client 105A acquires the lock 715 using the Lock Exclusive action, setting its state element 805 to "E," and returning the present value of each of the state element 805 (i.e., Return.state="E") and the version counter 810 (i.e., Return.version="2" hex) to the first client 105A. Since Return.version at time 1016 is the same as its previous value at time 1015, the data at first client 105A is deemed consistent with the data at storage device 115. According to one aspect of the invention, first client 105A does not update its local copy of the data since it is already consistent with the data at storage device 115. At time 1017, first client 105A does not modify the shared data stored in the one or more storage blocks 605 controlled the identified lock 715. Since the shared data was not modified, first client 105A releases the identified lock 715 at time 1018 using the Unlock action, which does not increment version counter 810, but which resets the state element 805 to "U." Execution of the Unlock action at time 1018 also returns the updated present value of each of the state element 805 (i.e., Return.state="U") and the version counter 810 (i.e., Return.version="2" hex) to the first client 105A. The released identified lock 715 is available for acquisition by other clients 105.

Example 2: Failure Recovery Using Device Locks

Recovery from failure of particular storage devices 115 or clients 105 or from Resets may use the failure recovery described with respect to Example 1. However, the device locks of Example 2 also provide a time-out mechanism after a period of inactivity, as described below.

Acquisition of a lock 715 using either Lock Shared or Lock Exclusive actions, starts an expiration timer associated with the lock 715 on the storage device 115. When the timer expires, if the lock 715 was acquired using the Lock Shared action, Lock[ID].expired is set to "1" hex to indicate that it expired from a shared acquisition, and if the lock 715 was acquired using the Lock Exclusive action, Lock[ID].expired is set to "2" hex to indicate that it expired from an exclusive acquisition. The global file system allows differently programmable durations of the expiration timers associated with locks 715 on different storage devices 115. It is understood that the global file system could also allow differently programmable durations of the expiration timers associated with locks 715 on the same storage device 115. The timer associated with a lock 715 is reset when the lock 715 is released (e.g., using Unlock or Unlock Increment actions) or when the lock 715 receives a Touch Lock action. A client 105 accessing a particular lock 715 receives return data including an indication of the status of the expiration timer associated with the lock 715. Moreover, using the Report Expired action, the client 105 obtains an indication of the expiration status field (Lock[ID].expired) of the expiration timers associated with all locks 715. Alternatively, using a Force Lock Exclusive action, the client 105 may forcibly acquire a lock 715 that was previously exclusively acquired by another client, but which has an associated expiration timer that has expired.

Example 2: Device Lock Command

The Device Lock (DLock) command of Example 2 is similar to that described with respect to Example 1. Table 12 illustrates the returned data to the client 105 resulting from the DLock command (for all actions except Report Expired). In Table 12, Bytes 0–1 indicate the length of the return data, which may vary according to, for example, the amount of WWN data in the returned WWN list. Bits 0–1 of Byte 2 indicate the state of the lock 715 (e.g., "U." "S," or "L"). Bits 2—3 of Byte 2 indicate the state of the expiration timer 820 associated with the lock 715 (e.g., not expired=0 hex, expired from "S"=1hex, expired from "E"=2 hex). Bit 6 of Byte 2 is the activity bit, which is set when activity monitoring of the version counter 810 is turned on. Bit 7 of Byte 2 is the Result bit, which carries the Return.result information from execution the DLock actions. Bytes 3–6 return the current value of the version counter 810. Byte 7 returns the current number of clients 105 that hold the lock 715. Bytes 8–N return a list of the names of clients 105 that hold the lock 715.

TABLE 12

Example 2 Returned Data

| Byte | Bit 7 | Bit 6 | Bit 5 | Bit 4 | Bit 3 | Bit 2 | Bit 1 | Bit 0 |
|---|---|---|---|---|---|---|---|---|
| 0 | | | | Return Data Length | | | | |
| 1 | | | | | | | | |
| 2 | Result | Activity | | Reserved | | Expired | | State |
| 3 | | | | Version Counter | | | | |
| 4 | | | | Number | | | | |
| 5 | | | | | | | | |
| 6 | | | | | | | | |
| 7 | | | | Number of Holders | | | | |
| 8–15 | | | | World Wide Name WWN | | | | |
| 16–23 | | | | World Wide Name WWN | | | | |
| 24–N | | | | . . . | | | | |

Table 13 illustrates the returned data obtained in response to a Report Expired Command. In Table 13, Bytes 0–1 indicate the length of the return data, which may vary according to, for example, the amount of lock expiration status data included in the bitmap. Bytes 2–N are a bitmap, with each bit representing the expiration status of the expiration timer 820 ("1"=Expired, "0"=Not Expired) associated with each lock 715 (e.g., L0=lock 715 with ID=0, L1=lock 715 with ID=1, etc.).

TABLE 13

Example 2 Returned Data From Report Expired action

| Byte | Bit 7 | Bit 6 | Bit 5 | Bit 4 | Bit 3 | Bit 2 | Bit 1 | Bit 0 |
|---|---|---|---|---|---|---|---|---|
| 0 | | | | Return Data Length | | | | |
| 1 | | | | | | | | |
| 2 | L7 | L6 | L5 | L4 | L3 | L2 | L1 | L0 |
| 3 | L15 | L14 | (Bitmap of Lock Expiration Data) | | | | L9 | L8 |
| 4 | L23 | L22 | L21 | L20 | L19 | L18 | L17 | L16 |
| 5–N | | | | . . . | | | | |

Table 14 illustrates, by way of example, but not by way of limitation, one embodiment of a Device Locks mode page on storage device 115 according to Example 2. According to one aspect of the invention, the Device Locks mode page is also used for configuring the device locks 715 on a storage device 115. The Device Locks mode page is identified by a hexadecimal code value of 29 in Byte 0 of the Device Locks mode page, as illustrated in Table 14. Bit 7 of Byte 0 also includes a Parameter Savable (PS) bit. The PS bit is set to indicate this page may be saved on storage device 115. A Mode Sense command is used to read the current Device Locks mode page on storage device 115. A Mode Select command is used to write the Device Locks mode page to storage device 115.

TABLE 14

SCSI Device Locks mode page for Example 2 (Hexadecimal values).

| Byte | Bit 7 | Bit 6 | Bit 5 | Bit 4 | Bit 3 | Bit 2 | Bit 1 | Bit 0 |
|---|---|---|---|---|---|---|---|---|
| 0 | PS | | | Vendor Unique Page Code=29 | | | | |
| 1 | | | | Page Length =06 | | | | |
| 2 | | | Maximum Number of Clients Able To Share a Lock (MaxHolders) | | | | | |
| 3 | | | | Reserved | | | | |
| 4 | | | | Number of Supported Locks | | | | |
| 5 | | | | (4 bytes) | | | | |
| 6 | | | | | | | | |
| 7 | | | | | | | | |
| 8 | | | | Lock Timeout Interval | | | | |
| 9 | | | | | | | | |
| 10 | | | | | | | | |
| 11 | | | | | | | | |

In Table 14, Byte 1 defines the length of the configuration data in the Device Locks mode page. Byte 2 represents an encoded value that defines the maximum number of clients 105 (i.e., "MaxHolders") that are allowed to share a particular lock 715. Bytes 4–7 represent the number of locks 715 supported by the storage device 115. Bytes 8–11 represent the current time-out interval (in milliseconds) of the expiration timer associated with the locks 715 on the storage device 115.

Conclusion

A serverless distributed architecture global distributed file system (GFS) maps device locks to storage blocks on storage devices. The device locks provide decentralized control of the shared data storage device on which they are located. Clients acquire the locks for excluding other clients, thereby maintaining data consistency and caching coherence. Alternatively, the clients acquire the locks for shared use with other clients. The serverless global distributed file system allows higher speed data transfer across the network, eliminates the risk of server failure, and reduces system cost and complexity. Shared data storage provides better utilization of storage resources, easier implementation of redundancy. Moreover, no communication between clients is required to arbitrate for the shared resources. Directly attaching a shared storage device to a client is susceptible to the risk of failure by that client; the present system avoids this problem. A locally attached shared storage device also wastes bandwidth of the local host client in transferring data to other clients; this is also avoided by the present invention. Moreover, data file size is not limited by the storage capacity available on any particular host client. Also, the present invention minimizes overhead steps for data transfer. Although the device locks have been described with respect to controlling associated storage blocks on storage devices, it is understood that the global distributed file system provides device locks that could also manage any other resource on devices in a networked computer system. Particular aspects of the present system are summarized below.

One aspect of the present system 100 includes a data storage device 115 accessible by first and second remote processing clients 105. The storage device includes a communication interface 116 that receives control signals from a distributed file system residing on both the first and second remote processing clients 105. At least one lock mechanism 715 is operatively coupled to the communication interface 116. Each lock mechanism 715 is associated with the use of a storage block 605 on the storage device 115 by each of the first and second processing clients 105. Each lock mechanism 715 controls access to a particular storage block 605 based on the control signals received from the distributed file system.

In various further embodiments, each lock mechanism 715 is adapted for allowing access by one of the first and second processing clients 105 to the storage block 605 associated with the lock mechanism 715, and excluding the other of the first and second processing clients 105 from accessing the storage block 605 associated with the lock mechanism 715. One embodiment includes a version counter 810, associated with the lock mechanism 715, the version counter 810 being updated when data is written to the storage block 605 associated with the lock mechanism 715. In one embodiment, the lock mechanism 715 is adapted to be released based on one of (a) a state of the version counter 810 associated with the lock mechanism 715, and (b) activity of the version counter 810 associated with the lock mechanism 715.

One embodiment includes an activity element 800 associated with the lock mechanism 715, wherein the activity element 800 and the version counter 810 associated with the lock mechanism 715 are each controlled by at least one of the first and second processing clients 105. If the activity element 800 is not set, the version counter 810 is updated when data is written to the particular storage block 605 controlled by the lock mechanism 715. If the activity element 800 is set, the version counter 810 is updated when data is written to or read from the particular storage block 605 associated with the lock mechanism 715.

In one embodiment, the file system on the processing clients 105 includes a remapping system that remaps the lock mechanisms 715 to the storage blocks 605 based on activity of the version counter 810 associated with the lock mechanism 715 relative to activity of a version counter 810 associated with another lock mechanism 715. One embodiment provides first and second storage media, the first storage medium 400A being faster to access than the second storage medium 400B, wherein the lock mechanism 715 resides on the first storage medium 400A, and the storage block 605 associated with the lock mechanism 715 resides on the second storage medium 400B. In one embodiment, the first storage medium 400A provides volatile storage and the second storage medium 400B provides nonvolatile storage. In one embodiment, the lock mechanism 715 includes an expiration timer 820. In another embodiment, the lock mechanism 715 includes a list 815 of processing clients 105 that have accessed the lock mechanism 715.

One embodiment includes a state element 805 associated with the lock mechanism 715, an activity element 800 associated with the lock mechanism 715, a version counter 810 associated with the lock mechanism 715, and a processor 117 that is adapted for executing an action selected from a group consisting of a Lock action, an Unlock action, an Unlock Increment action, a Reset Lock action, an Activity On action, an Activity Off action, a Lock Shared action, a Lock Exclusive action, a Force Lock Exclusive action, a Touch Lock action, and a Report Expired action, illustrative examples of which are described above with respect to Tables 3 and 11.

One embodiment of system 100 includes the storage device 115 and a network 110 coupling the first and second processing clients 105 to the communications interface 116 of the storage device 115.

Another aspect of the system 100 includes a method of use of system 100. The method includes: (a) assigning a lock mechanism 715 to a storage block 605 using the file system on first and second processing clients 105, and (b) accessing at least one of the storage blocks 605, using the first processing client 115A, by acquiring the lock mechanism 715 assigned to the storage block 605, if the lock mechanism 715 is available. System 100 also includes a computer-readable medium (e.g., on processing clients 105 and/or processor 117) having computer-executable instructions for performing steps (a) and (b).

One further embodiment includes a step (c) of releasing the lock mechanism 715 after accessing the storage block 605. In one embodiment, this includes updating a version counter 810 associated with the lock mechanism 715 if an activity element 800 associated with the lock mechanism 715 is set.

Another further embodiment includes: (c) writing data from the first processing client 105A to the storage block 605, (d) updating a version counter 810 associated with the lock mechanism 715 using the first processing client 105A, and (e) releasing the lock mechanism 715 using the first processing client 105A.

In one embodiment, step (b) of accessing includes waiting, if the lock mechanism 715 is unavailable, for the lock mechanism 715 to become available before acquiring the lock mechanism 715.

Another further embodiment includes: (c) setting an activity element 800 associated with the lock mechanism 715, and (d) updating a version counter 810 associated with the lock mechanism 715 when either of the first and the second processing clients 105 reads data from or writes data to the storage block 605 assigned to the lock mechanism 715, if the activity element 800 is set.

Another further embodiment includes steps of (e) waiting for a predetermined period of time after setting the activity element 800, (f) updating the version counter 810 associated with the lock mechanism 715, (g) releasing the lock mechanism 715, if the version counter 810 associated with the lock mechanism 715 is not updated during the predetermined period of time, and (h) clearing the activity element 800 associated with the lock mechanism 715, if the version counter 810 associated with the lock mechanism 715 is updated during the predetermined period of time. In one embodiment, the step (g) of releasing comprises sending a unit attention to at least one of the first and second processing clients 105 indicating that the lock mechanism 715 has been released.

Another further embodiment includes steps of: (c) requesting access, using the second processing client 105N, to the storage block 605 for which the first processing client 105A has acquired the lock mechanism 715, (d) setting an activity element 800 associated with the lock mechanism 715, using the second processing client 105N, if the second processing client 105N fails to acquire the lock mechanism 715, (e) updating a version counter 810 associated with the lock mechanism 715 when the first processing client 105A reads data from or writes data to the at least one storage block 605 assigned to the lock mechanism 715, if the activity element 800 is set, (f) waiting for a predetermined period of time after using the second processing client 105N to set the activity element 800, (g) updating the version counter 810 using the second processing client 105N, if the first processing client 105A has not updated the version counter 810 during the predetermined period of time, otherwise, clearing the activity element 800 associated with the lock mechanism 715 using the second processing client 105N if the version counter 810 is updated by the first processing client 105A during the predetermined period of time, and (h) releasing the lock mechanism 715 using the second processing client 105N, if the first processing client 105A has not updated the version counter 810 during the predetermined period of time. In a further embodiment, step (g) of updating includes providing an input version counter 810 value to the storage device 605 and determining whether a state of version counter 810 associated with the lock mechanism 715 matches the input version counter 810 value. A further embodiment includes step (i) of accessing the storage block 605, using the second processing client 105N. In one embodiment, step (h) of releasing comprises sending a unit attention from the storage device 605 to the first processing client indicating that the lock mechanism was released by the second processing client.

Another embodiment further includes steps of: (c) using the second processing client 1O5N to request access to the storage block 605 or which the first processing client 105A has acquired a lock mechanism 715, (d) waiting until the first processing client 105A has released the lock mechanism 715 before using the second processing client 105N to acquire the lock mechanism 715 on the storage device 115, and (e) accessing the storage block 605 using the second processing client 105N. A further embodiment includes steps of: (f) writing data from the second processing client 105N to the storage block 605, (g) updating a version counter 810 associated with the lock mechanism 715 using the second processing client 105N, and (h) releasing the lock mechanism 715 using the second processing client 105N.

In another embodiment, the step (a) of assigning includes mapping the lock mechanism 715 to the storage block 605 based on a state of a version counter 810 associated with the lock mechanism 715. In a different embodiment, the step (a) of assigning includes mapping the lock mechanism 715 to the storage block 605 based on activity of a version counter 810 associated with the lock mechanism 715, relative to activity of at least one other version counter 810 associated with a different lock mechanism 715.

In one embodiment, the step (b) of accessing includes an action selected from a group consisting of: acquiring the lock mechanism 715 for shared use with other processing clients 105, and acquiring the lock mechanism 715 for exclusive use by the first processing client 105A.

Another embodiment further comprises a step (c) of subsequently forcibly acquiring the lock mechanism 715, using the second processing client 105N, if step (b) of accessing included acquiring the lock mechanism 715 for exclusive use by the first processing client 105A. A different embodiment includes a step (c) of modifying an expiration timer 820 associated with the lock mechanism 715. Another embodiment includes a step (c) of obtaining the state of an expiration timer 820 associated with the lock mechanism 715.

Another aspect of system 100 includes a data storage device 115 that is accessible by first and second remote processing clients 105, the storage device 115 including means for locking a storage block 605 on the storage device 115 by each of the first and second processing clients 105 based on control signals received from a distributed file system residing on both of the first and second processing clients 105.

It is to be understood that the above description is intended to be illustrative, and not restrictive. Many other embodiments will be apparent to those of skill in the art upon reviewing the above description. The scope of the invention should, therefore, be determined with reference to the appended claims, along with the full cope of equivalents to which such claims are entitled.

What is claimed is:

1. A data storage device that is accessible by first and second remote processing clients, the storage device including:
   a communication interface that receives control signals from a distributed file system residing on both the first and second remote processing clients; and
   at least one lock mechanism, operatively coupled to the communication interface, each lock mechanism associated with the use of a storage block on the storage device by each of the first and second processing clients, wherein each lock mechanism controls access to a particular storage block based on the control signals received from the distributed file system, the first and second remote processing clients connecting to the storage block by bypassing a protocol stack overhead.

2. The device of claim 1, in which each lock mechanism is adapted for allowing access by one of the first and second processing clients to the storage block associated with the lock mechanism, and excluding the other of the first and second processing clients from accessing the storage block associated with the lock mechanism.

3. The device of claim 1, further comprising a version counter, associated with the lock mechanism, the version counter being updated when data is written to the storage block associated with the lock mechanism.

4. A data storage device that is accessible by first and second remote processing clients, the storage device including:
   a communication interface that receives control signals from a distributed file system residing on both the first and second remote processing clients;
   at least one lock mechanism, operatively coupled to the communication interface, each lock mechanism associated with the use of a storage block on the storage device by each of the first and second processing clients, wherein each lock mechanism controls access to a particular storage block based on the control signals received from the distributed file system; and a version counter, associated with the lock mechanism, the version counter being updated when data is written to the storage block associated with the lock mechanism, in which the lock mechanism is adapted to be released based on one of (a) a state of the version counter associated with the lock mechanism, and (b) activity of the version counter associated with the lock mechanism.

5. The device of claim 4, further comprising an activity element associated with the lock mechanism, wherein the activity element and the version counter associated with the lock mechanism are each controlled by at least one of the first and second processing clients such that:

if the activity element is not set, the version counter is updated when data is written to the particular storage block controlled by the lock mechanism; and if the activity element is set, the version counter is updated when data is written to or read from the particular storage block associated with the lock mechanism.

6. The device of claim 4, in which the file system includes a remapping system that remaps the lock mechanisms to the storage blocks based on activity of the version counter associated with the lock mechanism relative to activity of a version counter associated with another lock mechanism.

7. The device of claim 1, further comprising first and second storage media, the first storage medium being faster to access than the second storage medium, wherein the lock mechanism resides on the first storage medium, and the storage block associated with the lock mechanism resides on the second storage medium.

8. The device of claim 7, in which the first storage medium provides volatile storage and the second storage medium provides nonvolatile storage.

9. The device of claim 1, in which the lock mechanism includes an expiration timer.

10. The device of claim 1, in which the lock mechanism includes a list of processing clients that have accessed the lock mechanism.

11. A data storage device that is accessible by first and second remote processing clients, the storage device including:

a communication interface that receives control signals from a distributed file system residing on both the first and second remote processing clients; and at least one lock mechanism, operatively coupled to the communication interface, each lock mechanism associated with the use of a storage block on the storage device by each of the first and second processing clients, wherein each lock mechanism controls access to a particular storage block based on the control signals received from the distributed file system;

a state element associated with the lock mechanism, an activity element associated with the lock mechanism, a version counter associated with the lock mechanism, and a processor that is adapted for executing an action selected from a group consisting of:

a lock action, initiated by one of the first and second processing clients, the lock action identifying a specific one of the lock mechanisms and, in response to the lock action, the processor acquiring the identified lock mechanism, if available, and communicating whether the identified lock mechanism was acquired to the initiating processing client;

an unlock action, initiated by one of the first and second processing clients, the unlock action identifying a specific one of the lock mechanisms and, in response to the unlock action, the processor releasing the identified lock mechanism and, if the activity element associated with the identified lock mechanism is set, updating the version counter controlled by the identified lock mechanism;

an unlock increment action, initiated by one of the first and second processing clients, the unlock increment action identifying a specific one of the lock mechanisms and, in response to the unlock increment action, the processor releasing the identified lock mechanism and updating the version counter controlled by the identified lock mechanism independently of whether the activity element associated with the identified lock mechanism is set;

a reset lock action, initiated by one of the first and second processing clients, the reset lock action identifying a specific one of the lock mechanisms and, in response to the reset lock action, if a state of the version counter controlled by the identified lock mechanism matches an input version counter value, the processor (a) releases the identified lock mechanism, and (b) updates the version counter controlled by the identified lock mechanism;

an activity on action, initiated by one of the first and second processing clients, the activity on action identifying a specific one of the lock mechanisms and, in response to the activity on action, the processor sets the activity element associated with the identified lock mechanism;

an activity off action, initiated by one of the first and second processing clients, the activity off action identifying a specific one of the lock mechanisms and, in response to the activity off action, the processor clears the activity element associated with the identified lock mechanism;

a lock shared action, initiated by one of the first and second processing clients, the lock shared action identifying a specific one of the lock mechanisms and, in response to the lock shared action, the processor acquiring the identified lock mechanism for shared use by the initiating processing client, if available, and communicating whether the identified lock mechanism was acquired to the initiating processing client;

a lock exclusive action, initiated by one of the first and second processing clients, the lock exclusive action identifying a specific one of the lock mechanisms and, in response to the lock exclusive action, the processor acquiring the identified lock mechanism for exclusive use by the initiating processing client, if available, and communicating whether the identified lock mechanism was acquired to the initiating processing client;

a force lock exclusive action, initiated by one of the first and second processing clients, the force lock exclusive action identifying a specific one of the lock mechanisms that is acquired exclusively by a different one of the first and second processing clients and, in response to the force lock exclusive action, the processor acquiring the identified lock mechanism for exclusive use by the initiating processing client;

a touch lock action, initiated by one of the first and second processing clients, the touch lock action modifying an expiration timer associated with at least one lock mechanism that is acquired by the initiating processing client; and a report expired action, initiated by one of the first and second processing clients, the report expired action communicating to the initiating processing client a status of at least one expiration timer, the expiration timers being associated with the lock mechanisms.

12. A data storage device that is accessible by first and second remote processing clients, the storage device including:

a communication interface that receives control signals from a distributed file system residing on both the first and second remote processing clients; and at least one lock mechanism, operatively coupled to the communication interface, each lock mechanism associated with the use of a storage block on the storage device by each of the first and second processing clients, wherein each lock mechanism controls access to a particular storage block based on the control signals received from the distributed file system;

a state element associated with the lock mechanism, an activity element associated with the lock mechanism, a version counter associated with the lock mechanism, and a processor that is adapted for executing an action selected from a group consisting of:

a lock action, initiated by one of the first and second processing clients, the lock action identifying a specific one of the lock mechanisms and, in response to the lock action, the processor acquiring the identified lock mechanism, if available, and communicating whether the identified lock mechanism was acquired to the initiating processing client, wherein if the processor, in response to the lock action, determines that the state element of the identified lock mechanism is set, the storage device communicates a second return result to the initiating processing client, otherwise the processor sets the state element of the identified lock mechanism and the storage device communicates a first return result, which is different from the second return result, to the initiating processing client;

an unlock action, initiated by one of the first and second processing clients, the unlock action identifying a specific one of the lock mechanisms and, in response to the unlock action, the processor releasing the identified lock mechanism and, if the activity element associated with the identified lock mechanism is set, updating the version counter controlled by the identified lock mechanism, wherein the processor, in response to the unlock action, clears the state element of the identified lock mechanism and the storage device communicates a first return result to the initiating processing client, and if the activity element of the identified lock mechanism is set, the processor increments the version counter associated with the identified lock mechanism;

an unlock increment action, initiated by one of the first and second processing clients, the unlock increment action identifying a specific one of the lock mechanisms and, in response to the unlock increment action, the processor releasing the identified lock mechanism and updating the version counter controlled by the identified lock mechanism independently of whether the activity element associated with the identified lock mechanism is set, wherein the processor, in response to the unlock increment action, increments the version counter associated with the identified lock mechanism and clears the state element of the identified lock mechanism, and the storage device communicates a first return result to the initiating processing client;

a reset lock action, initiated by one of the first and second processing clients, the reset lock action identifying a specific one of the lock mechanisms and, in response to the reset lock action, if a state of the version counter controlled by the identified lock mechanism matches an input version counter value, the processor (a) releases the identified lock mechanism, and (b) updates the version counter controlled by the identified lock mechanism, wherein if the processor, in response to the reset lock action, determines that the state of the version counter associated with the identified lock mechanism matches the input version counter value, the processor increments the version counter associated with the identified lock mechanism and clears the state element of the identified lock mechanism, and the storage device communicates a first return result to the initiating processing client, otherwise the storage device communicates a second return result to the initiating processing client;

an activity on action, initiated by one of the first and second processing clients, the activity on action identifying a specific one of the lock mechanisms and, in response to the activity on action, the processor sets the activity element associated with the identified lock mechanism, wherein the storage device, in response to the activity on action, communicates a first return result to the initiating processing client after the processor sets the activity element associated with the identified lock mechanism;

an activity off action, initiated by one of the first and second processing clients, the activity off action identifying a specific one of the lock mechanisms and, in response to the activity off action, the processor clears the activity element associated with the identified lock mechanism, wherein the processor, in response to the activity off action, increments the version counter associated with the identified lock mechanism, and the storage device communicates a first return result to the initiating processing client after the processor clears the activity element associated with the identified lock mechanism;

a lock shared action, initiated by one of the first and second processing clients, the lock shared action identifying a specific one of the lock mechanisms and, in response to the lock shared action, the processor acquiring the identified lock mechanism for shared use by the initiating processing client, if available, and communicating whether the identified lock mechanism was acquired to the initiating processing client;

a lock exclusive action, initiated by one of the first and second processing clients, the lock exclusive action identifying a specific one of the lock mechanisms and, in response to the lock exclusive action, the processor acquiring the identified lock mechanism for exclusive use by the initiating processing client, if available, and communicating whether the identified lock mechanism was acquired to the initiating processing client;

a force lock exclusive action, initiated by one of the first and second processing clients, the force lock exclusive action identifying a specific one of the lock mechanisms that is acquired exclusively by a different one of the first and second processing clients and, in response to the force lock exclusive action, the processor acquiring the identified lock mechanism for exclusive use by the initiating processing client;

a touch lock action, initiated by one of the first and second processing clients, the touch lock action modifying an expiration timer associated with at least one lock mechanism that is acquired by the initiating processing client; and a report expired action, initiated by one of the first and second processing clients, the report expired action communicating to the initiating processing client a status of at least one expiration timer, the expiration timers being associated with the lock mechanisms.

13. A system including the storage device of claim 1, the system further comprising a network coupling the first and second processing clients to the communications interface of the storage device.

14. A method of using a system having first and second processing clients, a distributed file system that resides on both the first and second processing clients, a data storage device shared by the first and second processing clients, a communication network linking the storage device and the first and second processing clients bypassing protocol stack overheads, the data storage device including storage blocks and lock mechanisms, the method comprising steps of:

(a) assigning a lock mechanism to a storage block using the file system; and (b) accessing at least one of the storage blocks, using the first processing client, by acquiring the lock mechanism assigned to the storage block, if the lock mechanism is available.

15. The method of claim 14, further comprising a step (c) of releasing the lock mechanism after accessing the storage block.

16. The method of claim 15, in which the step (c) of releasing includes updating a version counter associated with the lock mechanism if an activity element associated with the lock mechanism is set.

17. The method of claim 14, further comprising steps of:

(c) writing data from the first processing client to the storage block;

(d) updating a version counter associated with the lock mechanism using the first processing client; and (e) releasing the lock mechanism using the first processing client.

18. The method of claim 14, wherein step (b) of accessing includes waiting, if the lock mechanism is unavailable, for the lock mechanism to become available before acquiring the lock mechanism.

19. A method of using a system having first and second processing clients, a distributed file system that resides on both the first and second processing clients, a data storage device shared by the first and second processing clients, a communication network linking the storage device and the first and second processing clients, the data storage device including storage blocks and lock mechanisms, the method comprising steps of:

(a) assigning a lock mechanism to a storage block using the file system;

(b) accessing at least one of the storage blocks, using the first processing client, by acquiring the lock mechanism assigned to the storage block, if the lock mechanism is available;

(c) setting an activity element associated with the lock mechanism; and (d) updating a version counter associated with the lock mechanism when either of the first and the second processing clients reads data from or writes data to the storage block assigned to the lock mechanism, if the activity element is set.

20. The method of claim 19, further comprising steps of:

(e) waiting for a predetermined period of time after setting the activity element;

(f) updating the version counter associated with the lock mechanism;

(g) releasing the lock mechanism, if the version counter associated with the lock mechanism is not updated during the predetermined period of time; and (h) clearing the activity element associated with the lock mechanism, if the version counter associated with the lock mechanism is updated during the predetermined period of time.

21. The method of claim 20, in which the step (g) of releasing comprises sending a unit attention to at least one of the first and second processing clients indicating that the lock mechanism has been released.

22. A method of using a system having first and second processing clients, a distributed file system that resides on both the first and second processing clients, a data storage device shared by the first and second processing clients, a communication network linking the storage device and the first and second processing clients, the data storage device including storage blocks and lock mechanisms, the method comprising steps of:

(a) assigning a lock mechanism to a storage block using the file system;

(b) accessing at least one of the storage blocks, using the first processing client, by acquiring the lock mechanism assigned to the storage block, if the lock mechanism is available;

(c) requesting access, using the second processing client, to the storage block for which the first processing client has acquired the lock mechanism;

(d) setting an activity element associated with the lock mechanism, using the second processing client, if the second processing client fails to acquire the lock mechanism;

(e) updating a version counter associated with the lock mechanism when the first processing client reads data from or writes data to the at least one storage block assigned to the lock mechanism, if the activity element is set;

(f) waiting for a predetermined period of time after using the second processing client to set the activity element;

(g) updating the version counter using the second processing client, if the first processing client has not updated the version counter during the predetermined period of time, otherwise, clearing the activity element associated with the lock mechanism using the second processing client if the version counter is updated by the first processing client during the predetermined period of time; and (h) releasing the lock mechanism using the second processing client, if the first processing client has not updated the version counter during the predetermined period of time.

23. The method of claim 22, in which the step (g) of updating includes providing an input version counter value to the storage device and determining whether a state of version counter associated with the lock mechanism matches the input version counter value.

24. The method of claim 22, further comprising a step (I) of accessing the storage block, using the second processing client.

25. The method of claim 22, wherein the step (h) of releasing comprises sending a unit attention from the storage device to the first processing client indicating that the lock mechanism was released by the second processing client.

26. The method of claim 14, further comprising steps of:
(c) using the second processing client to request access to the storage block for which the first processing client has acquired a lock mechanism;
(d) waiting until the first processing client has released the lock mechanism before using the second processing client to acquire the lock mechanism on the storage device; and
(e) accessing the storage block using the second processing client.

27. The method of claim 26, further comprising steps of:
(f) writing data from the second processing client to the storage block;
(g) updating a version counter associated with the lock mechanism using the second processing client; and
(h) releasing the lock mechanism using the second processing client.

28. The method of claim 14, in which the step (a) of assigning includes mapping the lock mechanism to the storage block based on a state of a version counter associated with the lock mechanism.

29. The method of claim 14, in which the step (a) of assigning includes mapping the lock mechanism to the storage block based on activity of a version counter associated with the lock mechanism, and activity of at least one other version counter associated with a different lock mechanism.

30. A computer-readable medium having computer-executable instructions for performing the actions recited in claim 14.

31. The method of claim 14, in which the step (b) of accessing includes an action selected from a group consisting of:
acquiring the lock mechanism for shared use with other processing clients; and
acquiring the lock mechanism for exclusive use by the first processing client.

32. The method of claim 31, further comprising a step (c) of subsequently forcibly acquiring the lock mechanism, using the second processing client, if step (b) of accessing included acquiring the lock mechanism for exclusive use by the first processing client.

33. The method of claim 14, further comprising a step (c) of modifying an expiration timer associated with the lock mechanism.

34. The method of claim 14, further comprising a step (c) of obtaining the state of an expiration timer associated with the lock mechanism.

* * * * *